US009810842B2

(12) United States Patent
Oka

(10) Patent No.: US 9,810,842 B2
(45) Date of Patent: *Nov. 7, 2017

(54) SUBSTRATE-TYPE OPTICAL WAVEGUIDE ELEMENT

(71) Applicant: FUJIKURA LTD., Tokyo (JP)

(72) Inventor: Akira Oka, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/447,615

(22) Filed: Mar. 2, 2017

(65) Prior Publication Data

US 2017/0176677 A1    Jun. 22, 2017

Related U.S. Application Data

(63) Continuation of application No. PCT/JP2016/051375, filed on Jan. 19, 2016.

(30) Foreign Application Priority Data

Jan. 19, 2015 (JP) .................. 2015-008118

(51) Int. Cl.
*G02F 1/035* (2006.01)
*G02B 6/126* (2006.01)
(Continued)

(52) U.S. Cl.
CPC ............. *G02B 6/126* (2013.01); *G02B 6/122* (2013.01); *G02B 6/125* (2013.01); *G02B 6/1228* (2013.01);
(Continued)

(58) Field of Classification Search
CPC ........ G02F 1/225; G02F 1/025; G02F 1/2255; G02F 2001/212; G02F 1/035; B82Y 20/00
See application file for complete search history.

(56) References Cited

U.S. PATENT DOCUMENTS 6,922,495 B2 * 7/2005 Sorin .................. G02B 6/03627
385/11
8,630,517 B2 * 1/2014 Okayama ........... G02B 6/12023
385/129
(Continued)

FOREIGN PATENT DOCUMENTS

JP        2004-529377 A     9/2004
WO     2014/208601 A1   12/2014

OTHER PUBLICATIONS

International Search Report dated Feb. 23, 2016, issued in counterpart International Application No. PCT/JP2016/051375. (2 pages).

(Continued)

*Primary Examiner* — Jennifer Doan
(74) *Attorney, Agent, or Firm* — Westerman, Hattori, Daniels & Adrian, LLP

(57) ABSTRACT

An effective refractive index of a TM0 polarized wave guided through the first core when existing alone and an effective refractive index of a TE0 polarized wave guided through the second core when existing alone are continuous as a function of a distance from a starting point of a side-by-side arrangement section. A magnitude relationship between an effective refractive index of an odd mode of a TE0 polarized wave guided through the side-by-side arrangement section and an effective refractive index of an even mode of a TM0 polarized wave guided through the side-by-side arrangement section is reversed between the starting point and an ending point of the side-by-side arrangement section. A refractive index distribution is vertically asymmetrical in an interaction section.

12 Claims, 22 Drawing Sheets

(51) Int. Cl.
  *G02B 6/125*  (2006.01)
  *G02B 6/14*   (2006.01)
  *G02F 1/01*   (2006.01)
  *G02B 6/122*  (2006.01)
  *G02B 6/27*   (2006.01)
  *H04J 14/06*  (2006.01)

(52) U.S. Cl.
  CPC ............. *G02B 6/14* (2013.01); *G02B 6/2773* (2013.01); *G02F 1/01* (2013.01); *G02F 1/011* (2013.01); *G02F 2203/07* (2013.01); *H04J 14/06* (2013.01)

(56) References Cited

U.S. PATENT DOCUMENTS

| | | | |
|---|---|---|---|
| 9,069,194 B2* | 6/2015 | Onishi | G02F 1/0136 |
| 2002/0186930 A1 | 12/2002 | Renoldi et al. | |
| 2007/0086704 A1 | 4/2007 | Ishikawa et al. | |
| 2015/0104128 A1 | 4/2015 | Oka et al. | |
| 2016/0025928 A1 | 1/2016 | Onawa | |
| 2016/0062038 A1 | 3/2016 | Oka | |
| 2016/0178841 A1 | 6/2016 | Oka et al. | |
| 2016/0178842 A1 | 6/2016 | Goi et al. | |

OTHER PUBLICATIONS

Mertens et al., "New Highly Efficient Polarization Converters Based on Hybrid Supermodes", Journal of Lightwave Technology, (1995), vol. 13, No. 10, pp. 2087. (6 pages).

Yariv et al., "Optical Electronics in Modem Communications (Fifth Edition)", Oxford University Press, (1997), (9 pages).

Sacher et al., "Polarization rotator-splitters in standard active silicon photonics platforms", Optics Express, (2014), vol. 22, No. 4, pp. 3777. (10 pages).

Wang et al., "Novel ultra-broadband polarization splitter-rotator based on mode-evolution tapers and a mode-sorting asymmetric Y-junction", Optics Express, (2014), vol. 22, No. 11, pp. 13565. (7 pages).

Dong et al., "112-Gb/s Monolithic PDM-QPSK Modulator in Silicon", ECOC2012 Th.3.B.1, (2012), (3 pages).

International Search Report dated Feb. 23, 2016, issued in International Application No. PCT/JP2016/051376. (2 pages).

Notice of Allowance dated Apr. 12, 2017 issued in co-pending U.S. Appl. No. 15/447,659.

Related co-pending U.S. Appl. No. 15/447,659.

* cited by examiner

SUBSTRATE-TYPE OPTICAL WAVEGUIDE ELEMENT

CROSS-REFERENCE TO RELATED APPLICATIONS

This application is a Continuation of PCT International Application No. PCT/JP2016/051375 filed in Japan on Jan. 19, 2016, which claims the benefit of patent application Ser. No. 2015-008118 filed in Japan on Jan. 19, 2015, the entire contents of which are hereby incorporated by reference.

TECHNICAL FIELD

The present invention relates to a substrate-type optical waveguide element that serves as a polarization multiplexing waveguide. Further, the present invention also relates to an optical modulator including the substrate-type optical waveguide element.

BACKGROUND ART

Recently, an amount of information to be transmitted over the optical communication continues to increase. In order to deal with the increased amount of information, countermeasures are taken, such as increasing a signal speed and/or increasing the number of channels employing a wavelength multiplexing communication technique. Among these, a next-generation 100 Gbps digital coherent transmission technique, which is capable of increasing a signal speed, employs a polarization multiplexing technique in order that an amount of transmittable information per unit time is doubled. According to the polarization multiplexing technique, different pieces of information are respectively carried by two types of polarized waves whose electric fields are orthogonal to each other. However, a modulation method employing the polarization multiplexing technique requires an optical modulator having a complex structure. This results in problems such as an increase in a device size and an increase in cost.

In order to address these problems, Non-Patent Literature 1 discloses an optical modulator including a substrate-type optical waveguide that includes a core made of silicon and has advantages such as an easy manufacturing process, a smaller optical element thanks to high-density integration, and a reduction in manufacturing cost due to use of a larger-diameter wafer.

The optical modulator employing the polarization multiplexing technique includes a polarization rotator (hereinafter, abbreviated as "PR") and a polarization beam combiner (hereinafter, abbreviated as "PBC"). FIG. 24 is a block diagram illustrating a configuration of PR 6, whereas FIG. 25 is a block diagram illustrating a configuration of PBC 7. PR 6 includes an input port and an output port. PR 6 receives a TE polarized wave via the input port, converts the TE polarized wave into a TM polarized wave, and outputs the TM polarized wave via the output port. PBC 7 includes a first input port, a second input port, and an output port. PBC 7 multiplexes a TE polarized wave inputted to the first input port and a TM polarized wave inputted to the second input port, and then outputs, via the output port, the TE polarized wave and the TM polarized wave thus multiplexed. By using PR 6 and PBC 7 in combination, it is possible to provide a polarization multiplexing waveguide.

FIG. 26 is a block diagram illustrating a configuration of an optical modulator 8 including a polarization multiplexing waveguide 9. Namely, the optical modulator 8 is an optical modulator employing the polarization multiplexing technique. The optical modulator 8 includes the polarization multiplexing waveguide 9 including PR 6 and PBC 7, a first phase modulator for modulating a TE polarized wave, and a second phase modulator for modulating a TM polarized wave.

Individual TE polarized wave light beams inputted to the respective phase modulators are modulated by independent electrical signals. Further, different pieces of information are superimposed thereon. The polarization multiplexing waveguide 9 is disposed so as to follow the phase modulators. Out of the two TE polarized waves inputted to the polarization multiplexing waveguide 9, the TE polarized wave inputted to the first input port is converted into a TM polarized wave. Then, the TM polarized wave and the TE polarized wave inputted to the second input port are multiplexed, and a resultant of the multiplexing is outputted. Thus, by employing the polarization multiplexing waveguide, it is possible to use the first phase modulator and the second phase modulator, which have similar configurations.

Herein, the TE polarized wave refers to a mode including, as a main component, an electric field component that is in a direction (hereinafter, referred to as a "width direction" or an "x-direction") horizontal to a substrate, in a plane perpendicular to a traveling direction of light in the substrate-type optical waveguide. Particularly, a TE polarized wave having a maximum effective refractive index is called a "TE0 polarized wave". Meanwhile, the TM polarized wave refers to a mode including, as a main component, an electric field component that is in a direction (hereinafter, referred to as a "height direction" or a "y-direction") perpendicular to the substrate, in the plane perpendicular to the traveling direction of light in the substrate-type optical waveguide. Particularly, a TM polarized wave having a maximum effective refractive index is called a "TM0 polarized wave". The TE0 polarized wave and the TM0 polarized wave are confined in the waveguides strongly more than any other TE polarized waves and any other TM polarized waves. For this reason, the TE0 polarized wave and the TM0 polarized wave are waveguide modes widely used for the substrate-type optical waveguide element.

Non-Patent Literatures 2 and 3 disclose a polarized wave beam splitter. The polarized wave beam splitter disclosed by Non-Patent Literatures 2 and 3 may also serve as a polarization beam combiner when an input and an output thereof are reversed.

A substrate-type optical waveguide element according to Non-Patent Literature 2 is constituted by two elements, specifically, asymmetric Y-branching (corresponding to an asymmetric Y-junction of Non-Patent Literature 2) and a tapered waveguide having a rib waveguide structure (corresponding to a taper of Non-Patent Literature 2). In a case where the substrate-type optical waveguide element of Non-Patent Literature 2 serves as a polarization beam combiner, the asymmetric Y-branching converts, into a TE1 polarized wave, one of two TE0 polarized waves that are spatially divided, and multiplexes the TE1 polarized wave thus converted and the other one of the two TE0 polarized waves. Here, the TE1 polarized wave refers to a waveguide mode having a second maximum effective refractive index among the TE polarized waves. The tapered waveguide converts, into a TM0 polarized wave, only the TE1 polarized wave out of the TE1 polarized wave and the TE0 polarized wave multiplexed by the asymmetric Y-branching. In this manner, the element according to Non-Patent Literature 2 serves as the polarization multiplexing waveguide.

A substrate-type optical waveguide element according to Non-Patent Literature 3 is constituted by two elements, specifically, an adiabatic conversion coupler (an adiabatic coupler of Non-Patent Literature 3) and a tapered waveguide having a rib waveguide structure (a bi level taper of Non-Patent Literature 3). In a case where the substrate-type optical waveguide element of Non-Patent Literature 3 serves as a polarization beam combiner, the adiabatic conversion coupler converts, into a TE1 polarized wave, one of two TE0 polarized waves that are spatially divided, and multiplexes the TE1 polarized wave thus converted and the other one of the two TE0 polarized waves. Here, the TE1 polarized wave refers to a waveguide mode having a second maximum effective refractive index among the TE polarized waves. The tapered waveguide converts, into a TM0 polarized wave, the TE1 polarized wave out of the TE1 polarized wave and the TE0 polarized wave multiplexed by the adiabatic conversion coupler. In this manner, the element according to Non-Patent Literature 3 serves as the polarization multiplexing waveguide.

CITATION LIST

[Non-Patent Literature]
[Non-Patent Literature 1]
Po Dong, et al., "112-Gb/s Monolithic PDM-QPSK Modulator in Silicon", ECOC2012 Th.3.B.1 (2012)
[Non-patent Literature 2]
Jing Wang, et al., "Novel ultra broad-band polarization splitter-rotator based on mode-evolution tapers and a mode-sorting asymmetric Y-junction", OPTICS EXPRESS, Vol. 22, No. 11, pp. 13565 (2014)
[Non-patent Literature 3]
Wesley D. Sacher, et al., "Polarization rotator -splitters in standard active silicon photonics platforms", OPTICS EXPRESS, Vol. 22, No. 4, pp. 3777 (2014)
[Non-patent Literature 4]
Amnon Yariv, "Optical Electronics in Modern Communications (FIFTH EDITION)", Oxford University Press (1997)
[Non-patent Literature 5]
Konrad Mertens, et al., "New Highly Efficient Polarization Converters Based on Hybrid Supermodes", JOURNAL OF LIGHTWAVE TECHNOLOGY, Vol. 13, No. 10, pp. 2087 (1995)

SUMMARY OF INVENTION

Technical Problem

However, each of the substrate-type optical waveguide elements disclosed by Non-Patent Literatures 2 and 3 has the following problem. That is, a total length of the element, i.e., a device length is long, and thus it is difficult to avoid a large-size structure.

The substrate-type optical waveguide element disclosed by Non-patent Literature 2 needs the two elements, specifically, (i) the asymmetric Y-branching for converting one TE0 polarized wave into a TE1 polarized wave and multiplexing the TE1 polarized wave and the other TE0 polarized wave and (ii) the tapered waveguide for converting the TE1 polarized wave into a TM0 polarized wave. Therefore, it is difficult to avoid a long device length.

As well as the substrate-type optical waveguide element disclosed by Non-Patent Literature 2, the substrate-type optical waveguide element disclosed by Non-Patent Literature 3 needs the two different elements in order to serve as the polarization multiplexing waveguide. Therefore, it is difficult to avoid a long device length.

An embodiment of the present invention was made in view of the above problem. An object of an embodiment of the present invention is to reduce a device length of a substrate-type optical waveguide element that serves as a polarization multiplexing waveguide, for the purpose of reducing a size of the substrate-type optical waveguide element.

Solution to Problem

In order to attain the above object, a substrate type optical waveguide element according to an embodiment of the present invention is a substrate-type optical waveguide element including: a lower cladding; a core on the lower cladding, the core including a first core and a second core arranged side by side and a third core having an entrance edge surface connected to emission edge surfaces of the first core and the second core; and an upper cladding on the lower cladding, the upper cladding covering the core, the first core and the second core being arranged side by side in a side-by-side arrangement section that is started in a starting point corresponding to entrance edge surfaces of the first core and the second core and is ended in an ending point corresponding to the emission edge surfaces of the first core and the second core, an effective refractive index of a TE0 polarized wave guided through the first core in the absence of the second core being lower than an effective refractive index of a TE0 polarized wave guided through the second core in the absence of the first core, each of the effective refractive indexes being observed in the starting point of the side-by-side arrangement section, an effective refractive index of a TM0 polarized wave guided through the first core in the absence of the second core and the effective refractive index of the TE0 polarized wave guided through the second core in the absence of the first core being continuous as a function of a distance from the starting point of the side-by-side arrangement section, a magnitude relationship between an effective refractive index of an odd mode of a TE0 polarized wave guided through the core and an effective refractive index of an even mode of a TM0 polarized wave guided through the core being reversed between the starting point and the ending point of the side-by-side arrangement section, a refractive index distribution in a cross-section of the substrate-type optical waveguide element being vertically asymmetrical, the cross-section being perpendicular to a traveling direction of light guided through the core, the cross-section being in an interaction section, in which the odd mode of the TE0 polarized wave guided through the core and the even mode of the TM0 polarized wave guided through the core interact with each other.

Further, the substrate-type optical waveguide element according to an embodiment of the present invention may alternatively be expressed as a substrate-type optical waveguide element including: a lower cladding; a core on the lower cladding, the core including a first core and a second core arranged side by side and a third core having an entrance edge surface connected to emission edge surfaces of the first core and the second core; and an upper cladding on the lower cladding, the upper cladding covering the core, the first core and the second core being arranged side by side in a side-by-side arrangement section that is started in a starting point corresponding to entrance edge surfaces of the first core and the second core and is ended in an ending point corresponding to the emission edge surfaces of the first core and the second core, an effective refractive index of a TE0 polarized wave guided through the first core in the absence of the second core being lower than an effective refractive index of a TE0 polarized wave guided through the second core in the absence of the first core, each of the effective refractive indexes being observed in the starting point of the side-by-side arrangement section, a magnitude relationship between an effective refractive index of an odd mode of a TE0 polarized wave guided through the core and an effective refractive index of an even mode of a TM0 polarized wave guided through the core being reversed between the starting point and the ending point of the side-by-side arrangement section, a refractive index distribution in a cross-section of the substrate-type optical waveguide element being vertically asymmetrical, the cross-section being perpendicular to a traveling direction of light guided through the core, the cross-section being in an interaction section, in which the odd mode of the TE0 polarized wave guided through the core and the even mode of the TM0 polarized wave guided through the core interact with each other, a mode that is the odd mode of the TE0 polarized wave in the starting point of the side-by-side arrangement section and a mode that is the even mode of the TM0 polarized wave in the starting point of the side-by-side arrangement section being continuous as a function of a distance from the starting point of the side-by-side arrangement section.

Advantageous Effects of Invention

According to an embodiment of the present invention, it is possible to reduce the device length of the substrate-type optical waveguide element that serves as the polarization multiplexing waveguide.

BRIEF DESCRIPTION OF DRAWINGS (a) of FIG. 1 is a top view of a substrate-type optical waveguide element according to a first embodiment of the present invention. (b) and (c) of Fig. 1 are cross-sectional views of the substrate-type optical waveguide element shown in (a) of FIG. 1.

(a) and (b) of FIG. 2 are top views of the substrate-type optical waveguide element for explaining functions of the substrate-type optical waveguide element.

(a) through (f) of FIG. 3 each show a result of numerical calculation of an electric field occurring when a TE0 polarized wave was inputted to a first entrance port of the substrate-type optical waveguide element, the numerical calculation having been performed in a respective cross-section of the substrate-type optical waveguide element, the respective cross-section being perpendicular to a traveling direction of light.

(a) through (f) of FIG. 4 each show a result of numerical calculation of an electric field occurred when a TE0 polarized wave was inputted to a second entrance port of the substrate-type optical waveguide element, the numerical calculation having been performed in respective cross-section of the substrate-type optical waveguide element, the respective cross-section being perpendicular to the traveling direction of light.

(a) of FIG. 5 is a top view of a substrate-type optical waveguide element according to an example of the present invention. (b) and (c) of FIG. 5 are cross-sectional views of the substrate-type optical waveguide element shown in (a) of FIG. 5.

FIG. 6 is a graph showing a result of numerical calculation of effective refractive indexes of an even mode of a TE0 polarized wave, an odd mode of a TE0 polarized wave, and an even mode of TM0 guided through a core of the substrate-type optical waveguide element according to the example of the present invention, the numerical calculation having been performed along a traveling direction of light.

(a) of FIG. 7 is a top view of a substrate-type optical waveguide element according to a comparative example of the present invention. (b) and (c) of FIG. 7 are cross-sectional views of the substrate-type optical waveguide element shown in (a) of FIG. 7.

FIG. 8 is a graph showing a result of numerical calculation of effective refractive indexes of an even mode of a TE0 polarized wave, an odd mode of a TE0 polarized wave, and an even mode of TM0 guided through a core of the substrate-type optical waveguide element according to the comparative example of the present invention, the numerical calculation having been performed along a z-direction, which is a traveling direction of light.

Figure 12:
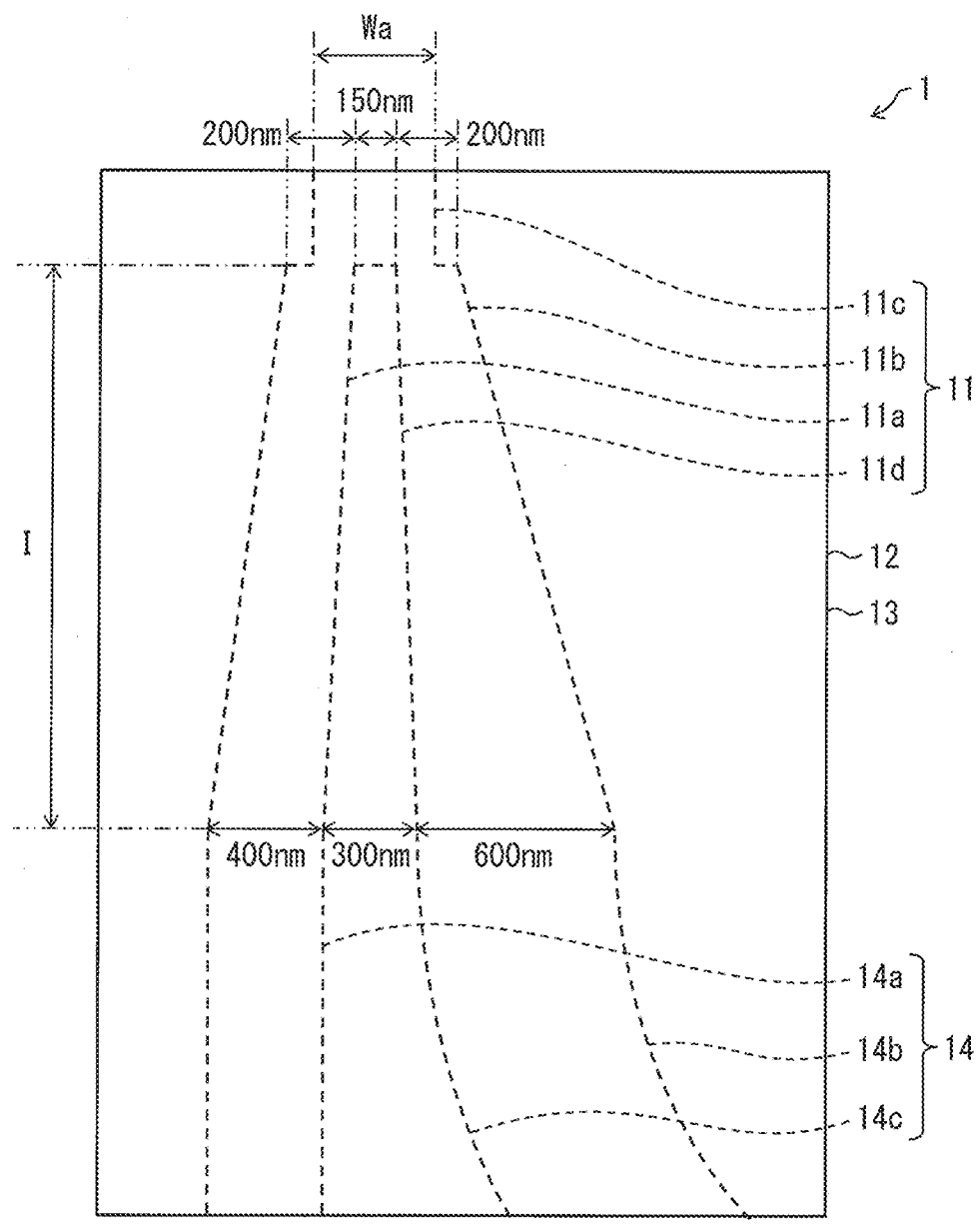
FIG. 12 is a top view of a substrate-type optical waveguide element according to an embodiment of the present invention that was used for numerical simulation.
Figure 14:
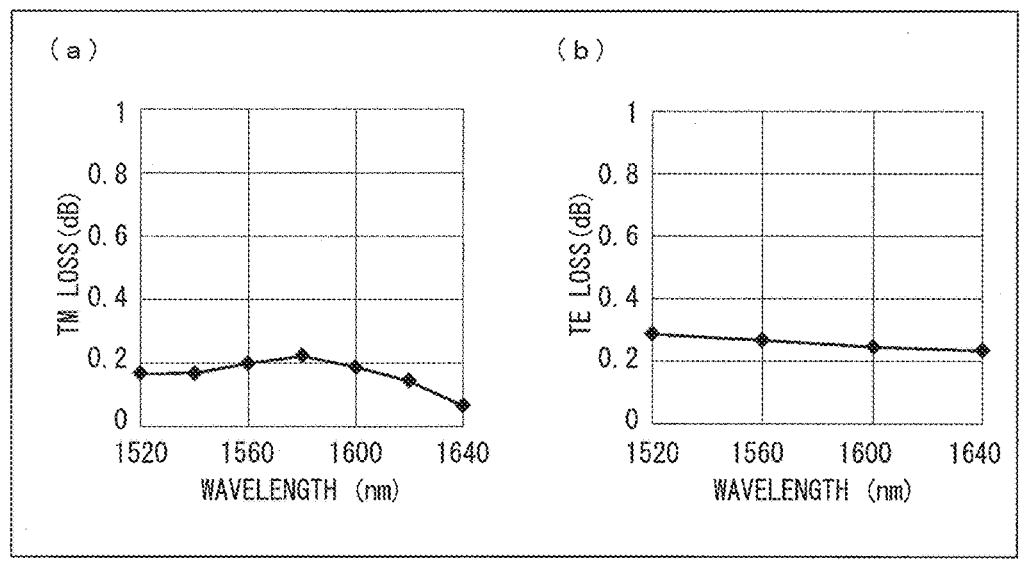

(a) and (b) of FIG. 14 are graphs respectively showing results of numerical calculation of light wavelength dependencies of a TM loss and a TE loss of the substrate-type optical waveguide element shown in FIG. 12, in a case where the substrate-type optical waveguide element was configured to have a device length of 80 µm and a width $W_a$ of 400 nm.

Figure 15:
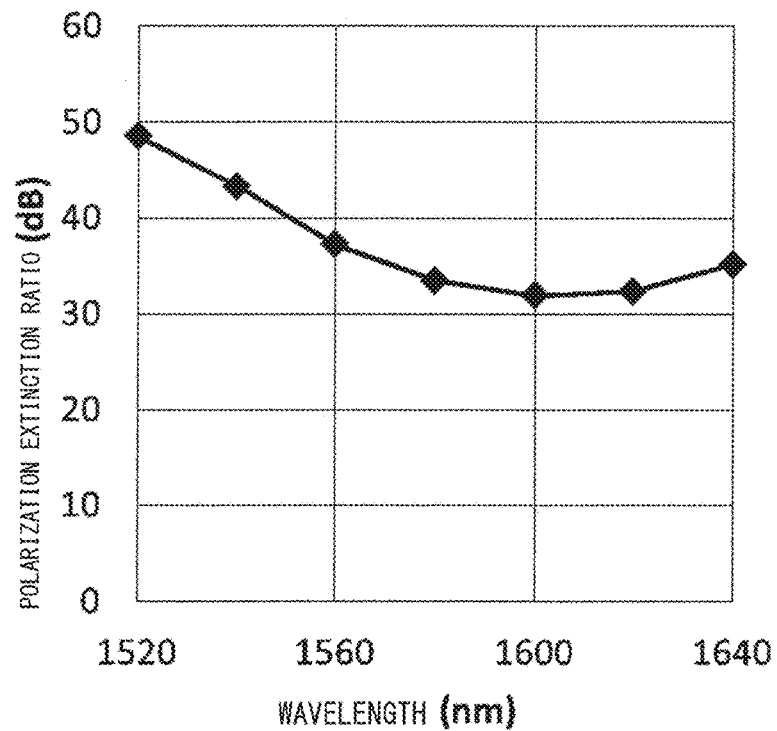

FIG. 15 is a graph showing a result of numerical calculation of a light wavelength dependency of a polarization extinction ratio of the substrate-type optical waveguide element shown in FIG. 12, in a case where the substrate-type optical waveguide element was configured to have a device length of 80 µm and a width $W_a$ of 400 nm.

Figure 16:
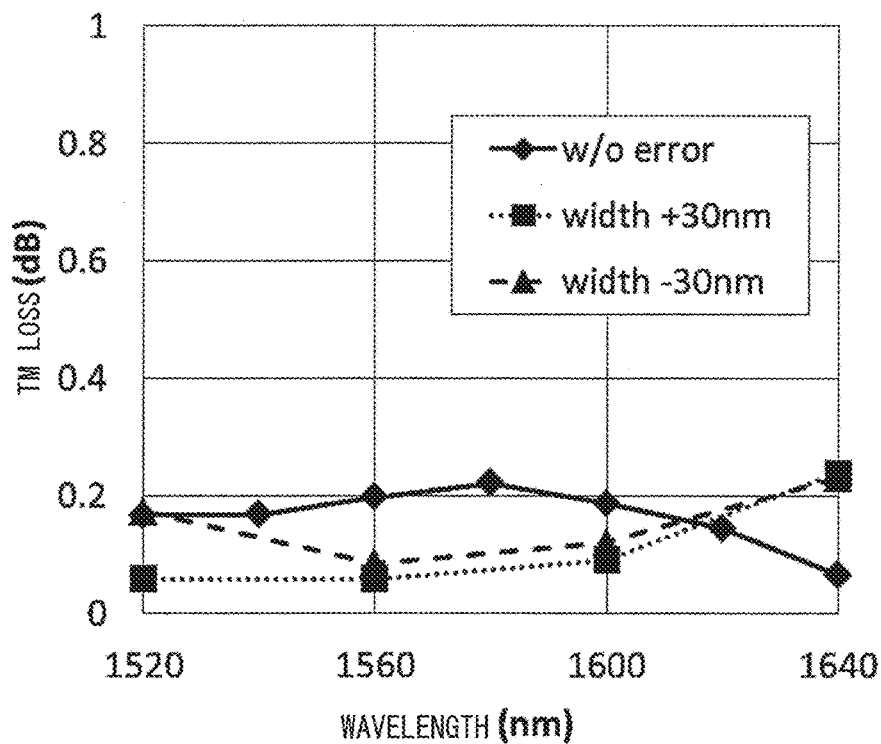

FIG. 16 is a graph showing a result of numerical calculation of a light wavelength dependency of a TM loss of the substrate-type optical waveguide element shown in FIG. 12, in a case where the substrate-type optical waveguide element was configured to have a device length of 80 µm and a width $W_a$ of 400 nm.

Figure 17:
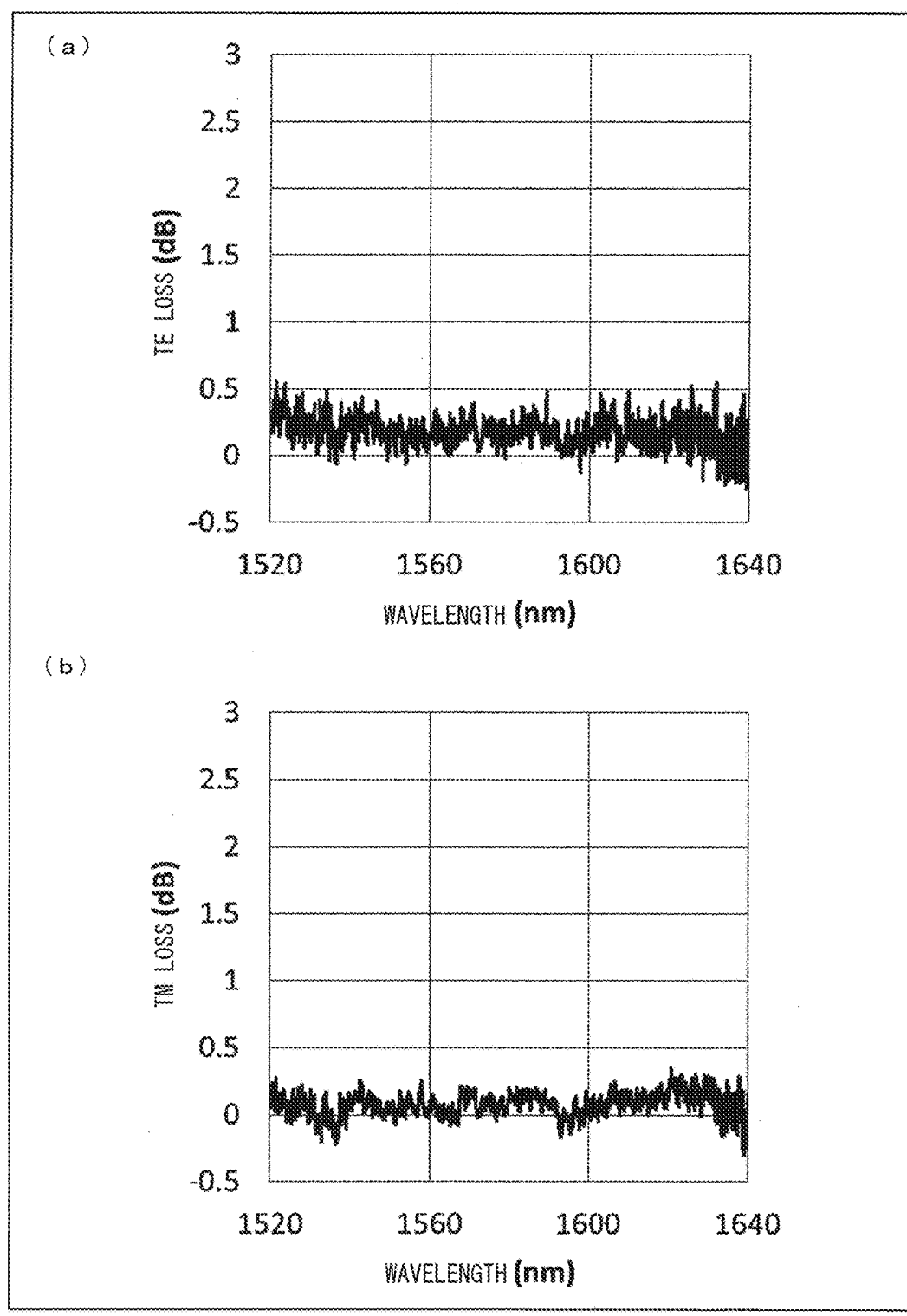

(a) and (b) of FIG. 17 are graphs respectively showing light wavelength dependencies of a TM loss and a TE loss of the substrate-type optical waveguide element shown in FIG. 12, in a case where the substrate-type optical waveguide element was configured to have a device length of 80 µm and a width $W_a$ of 400 nm.

Figure 18:
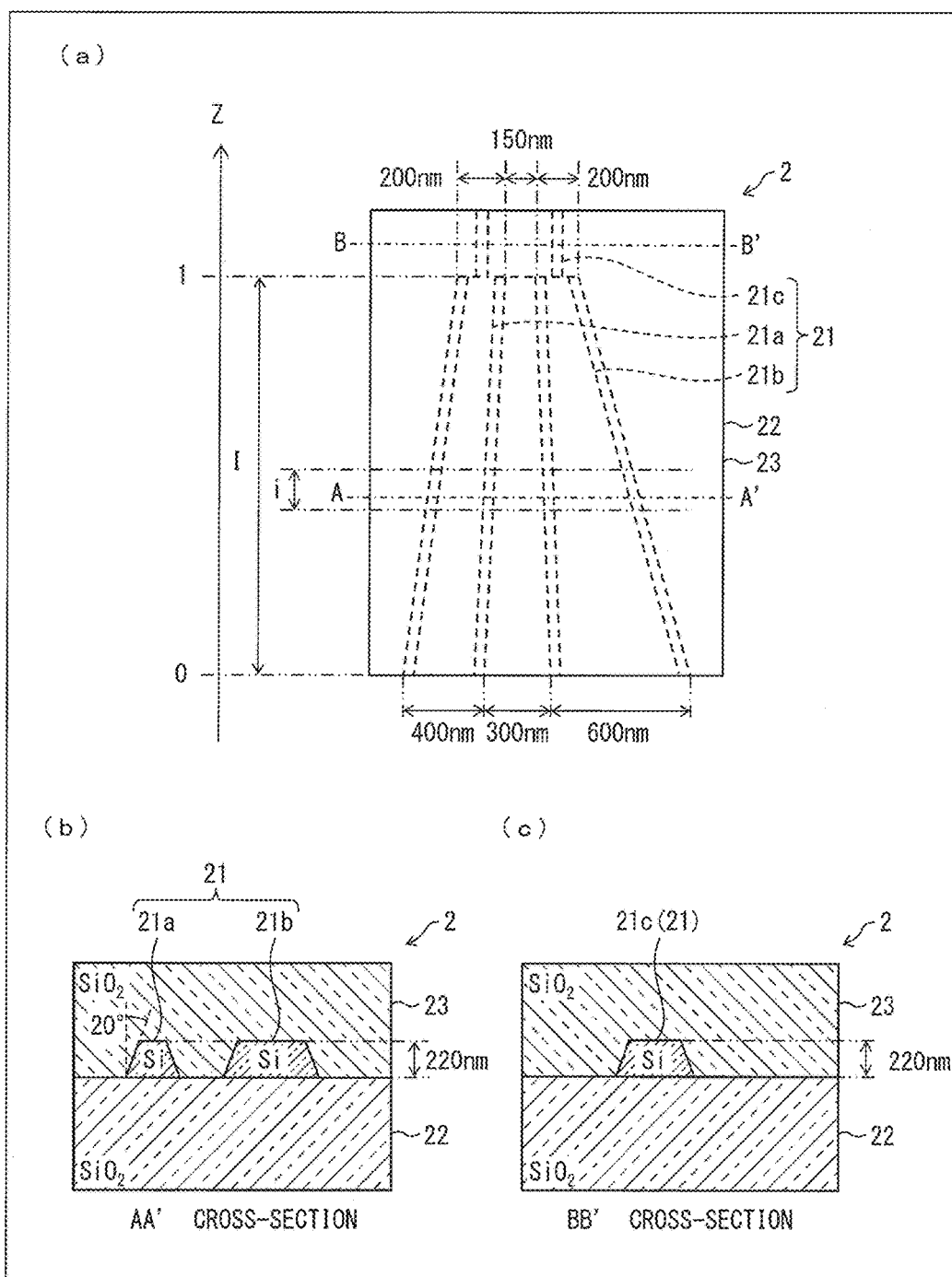

(a) of FIG. 18 is a top view of a substrate-type optical waveguide element according to a second embodiment of the present invention. (b) and (c) of FIG. 18 are cross-sectional views of the substrate-type optical waveguide element shown in (a) of FIG. 18.

Figure 19:
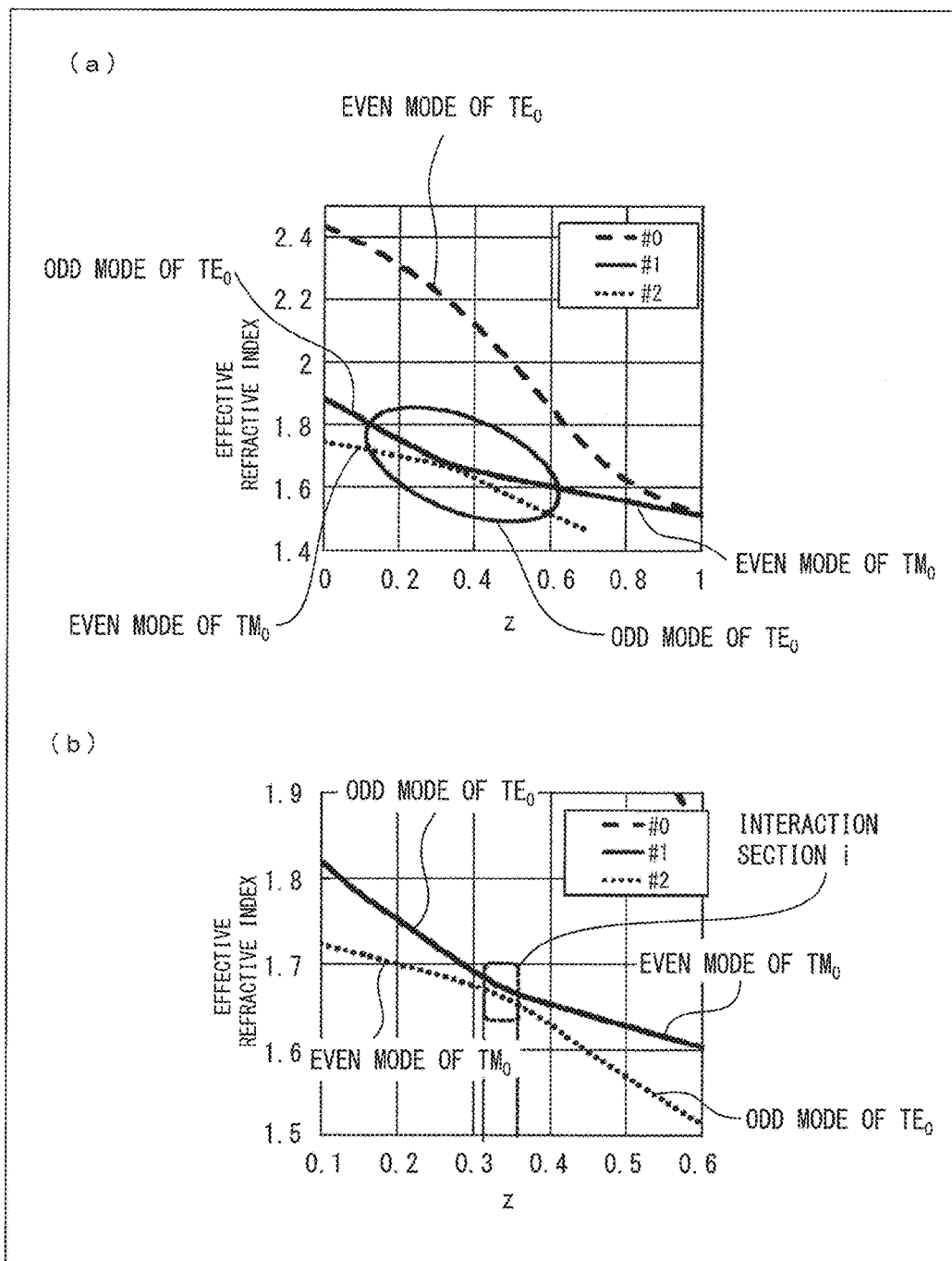

(a) of FIG. 19 is a graph showing a result of numerical calculation of effective refractive indexes of an even mode of a TE0 polarized wave, an odd mode of a TE0 polarized wave, and an even mode of TM0 guided through a core of the substrate-type optical waveguide element according to the second embodiment of the present invention, the numerical calculation having been performed along a traveling direction of light. (b) of FIG. 19 is a graph providing an enlarged view of an interaction section i and its vicinity shown in the graph of (a) of FIG. 19.

Figure 20:
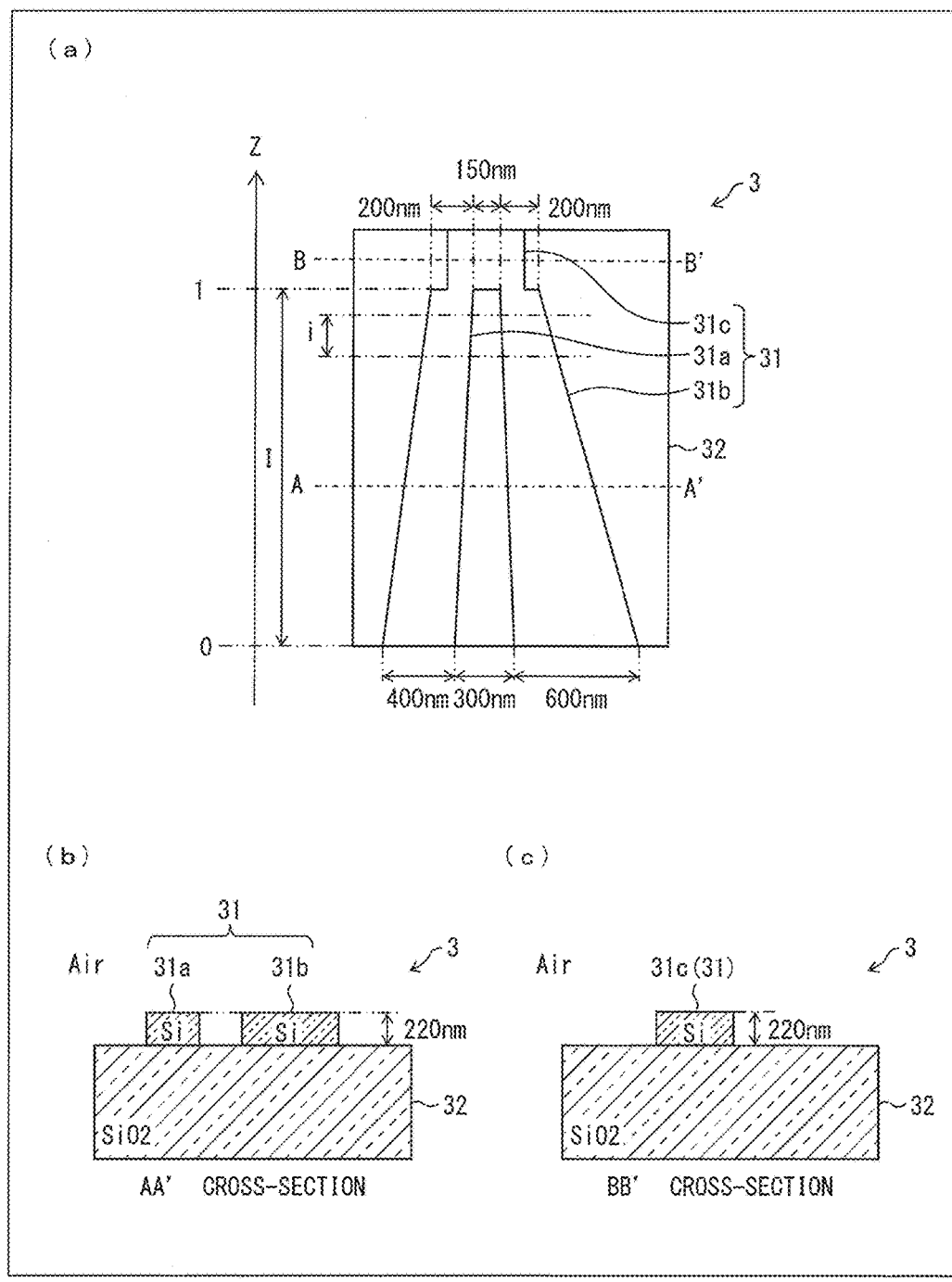

(a) of FIG. 20 is a top view of a substrate-type optical waveguide element according to a third embodiment of the present invention. (b) and (c) of FIG. 20 are cross-sectional views of the substrate-type optical waveguide element shown in (a) of FIG. 20.

Figure 21:
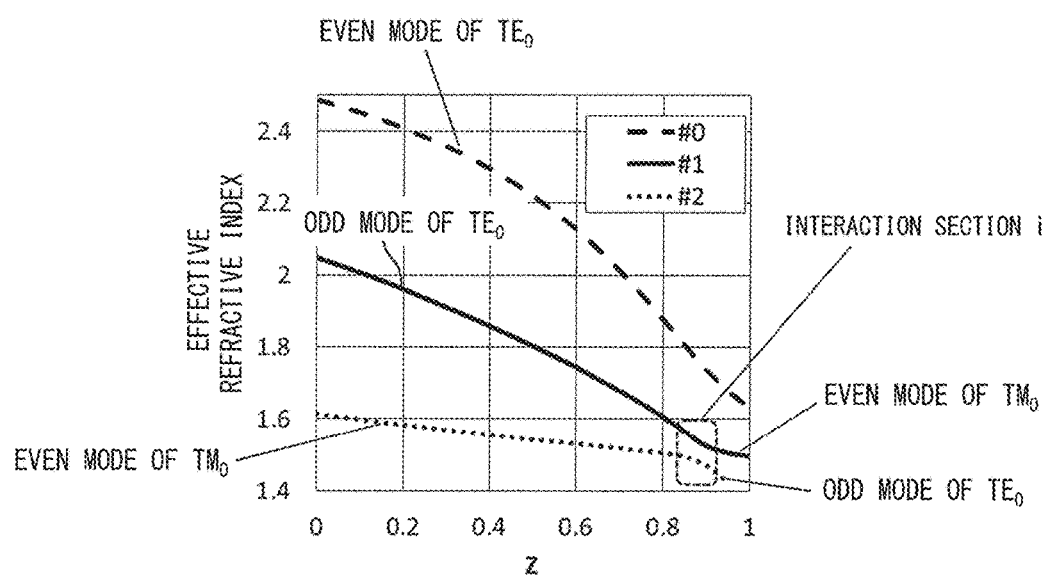

FIG. 21 is a graph showing a result of numerical calculation of effective refractive indexes of an even mode of a TE0 polarized wave, an odd mode of a TE0 polarized wave, and an even mode of TM0 guided through a core of the substrate-type optical waveguide element according to the third embodiment of the present invention, the numerical calculation having been performed along a traveling direction of light.

Figure 22:
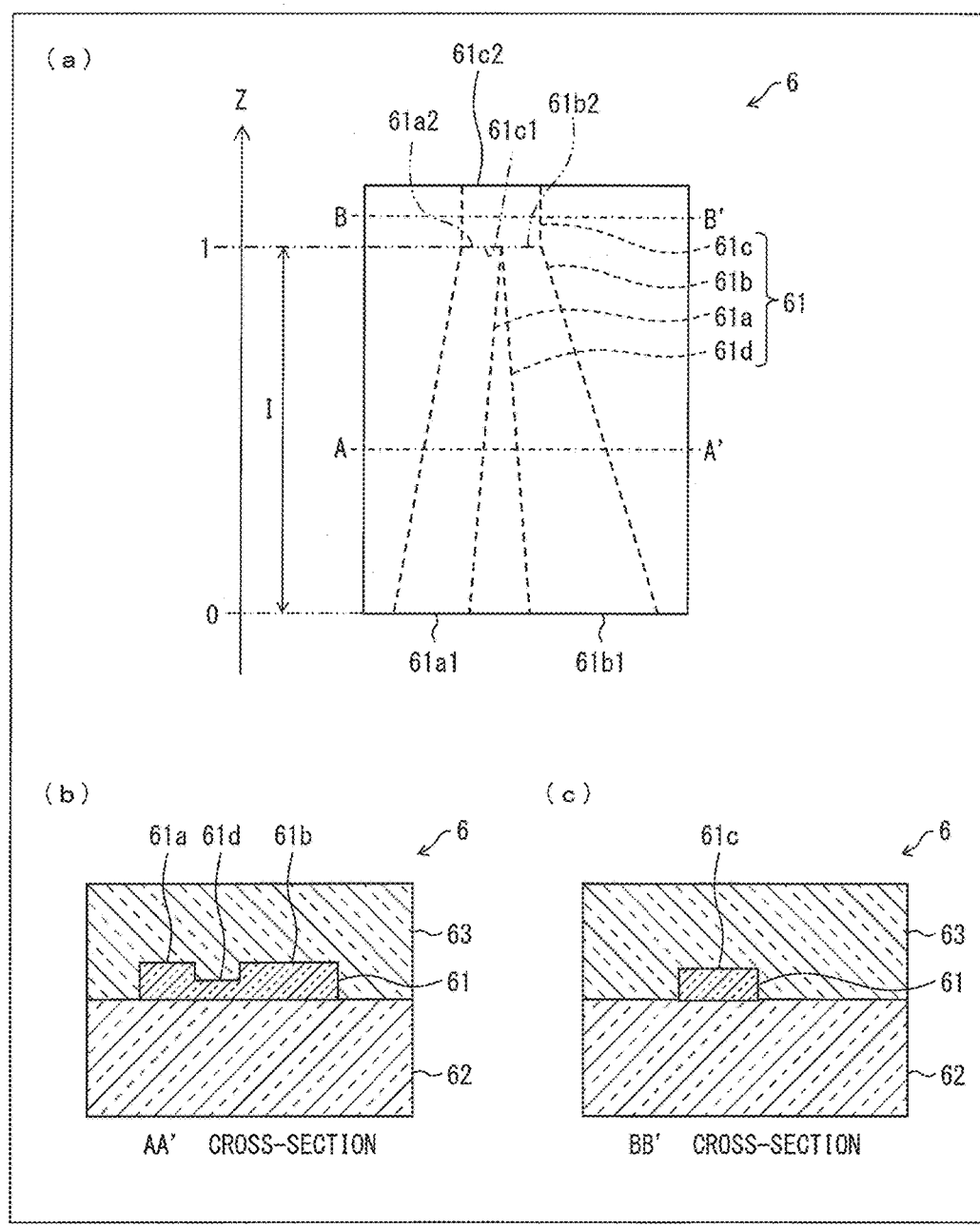

(a) of FIG. 22 is a top view of a substrate-type optical waveguide element according to a fourth embodiment of the present invention. (b) and (c) of FIG. 22 are cross-sectional views of the substrate-type optical waveguide element shown in (a) of FIG. 22.

Figure 23:
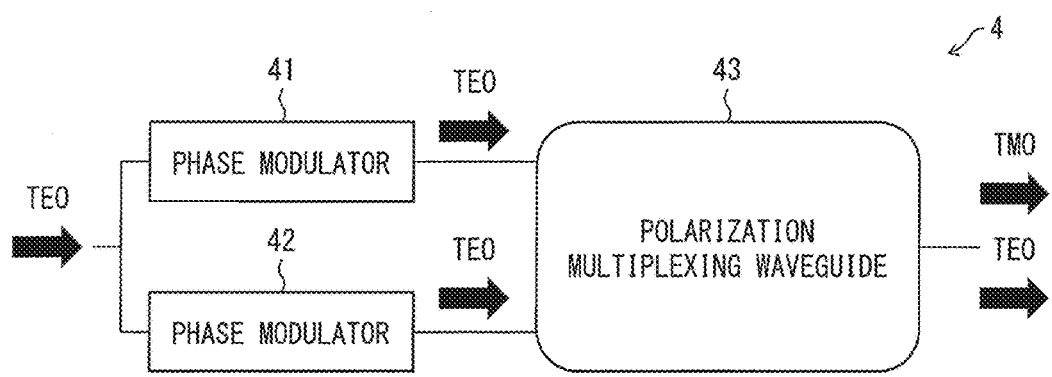

FIG. 23 is a block diagram illustrating a configuration of an optical modulator according to an application example of the present invention.

Figure 24:
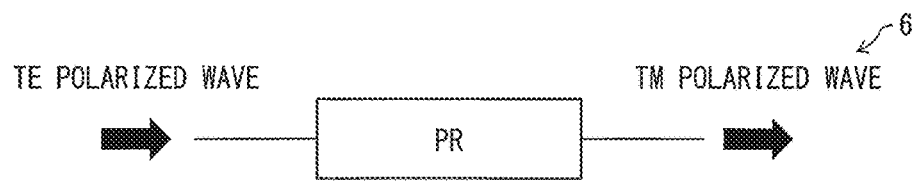

FIG. 24 is a block diagram illustrating a configuration of a known polarization rotator.

Figure 25:
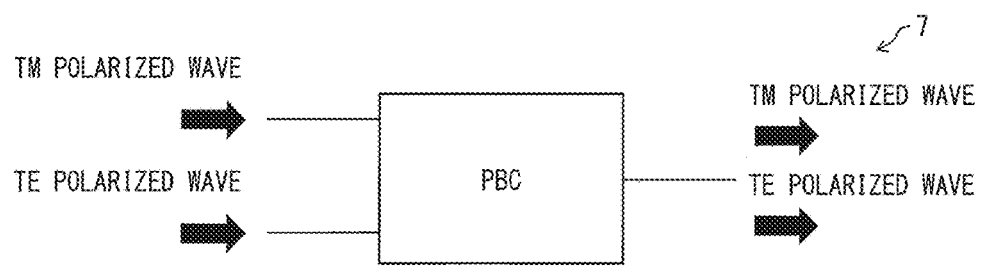

FIG. 25 is block diagram illustrating a configuration of a known polarization beam combiner.

Figure 26:
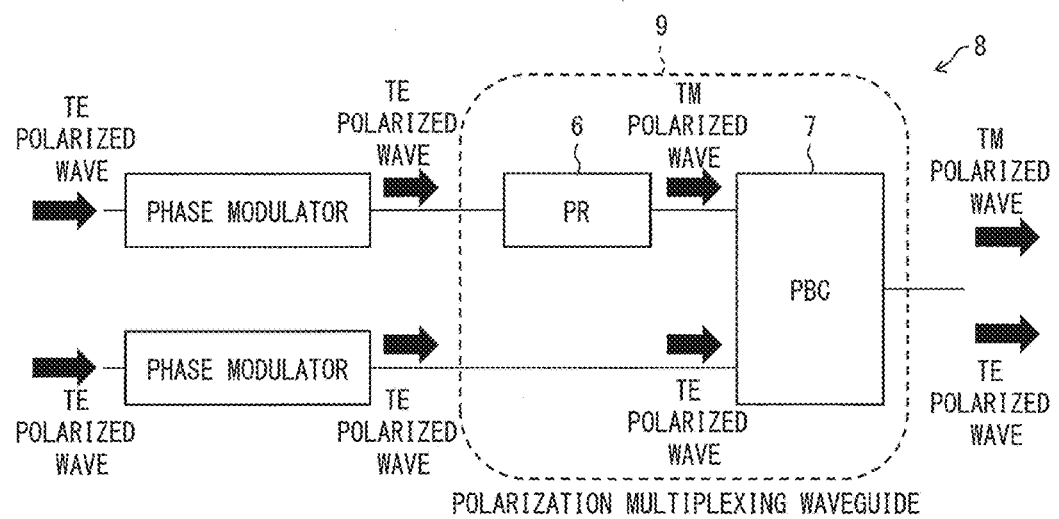

FIG. 26 is a block diagram illustrating a configuration of an optical modulator including the known polarization rotator and the known polarization beam combiner.

Figure 27:
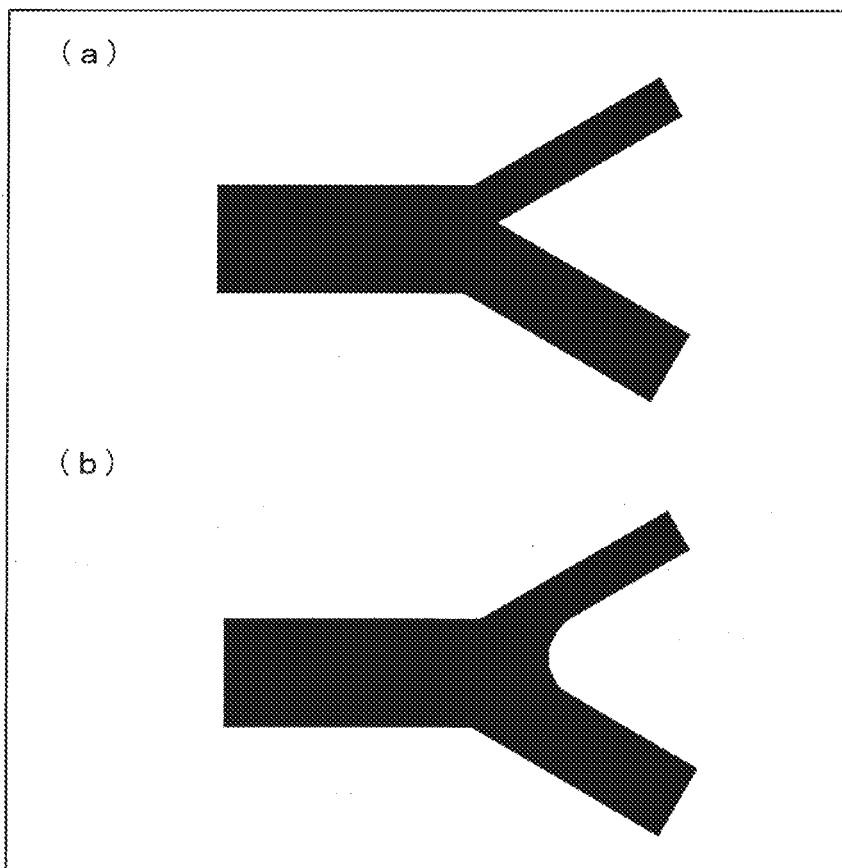

(a) of FIG. 27 is a top view of a core having an ideal asymmetric Y-branching structure. (b) of FIG. 27 is a top view of a core that was manufactured actually, the core having an asymmetric Y-branching structure.

DESCRIPTION OF EMBODIMENTS

[First Embodiment]

With reference to the drawings, the following describes a first embodiment of a substrate-type optical waveguide element according to the present invention.

(Configuration of Substrate-Type Optical Waveguide Element)

Figure 1:
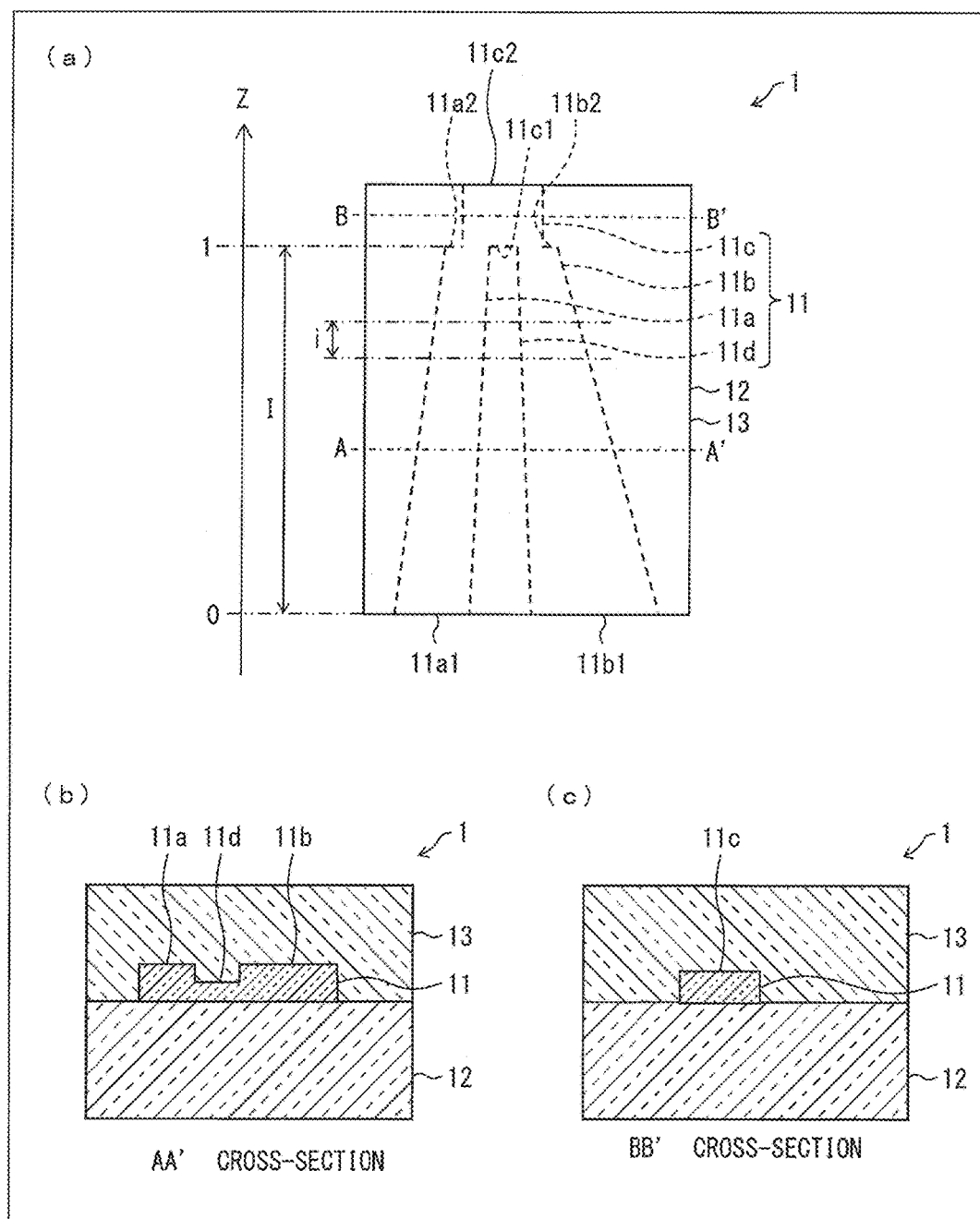
Figure 2:
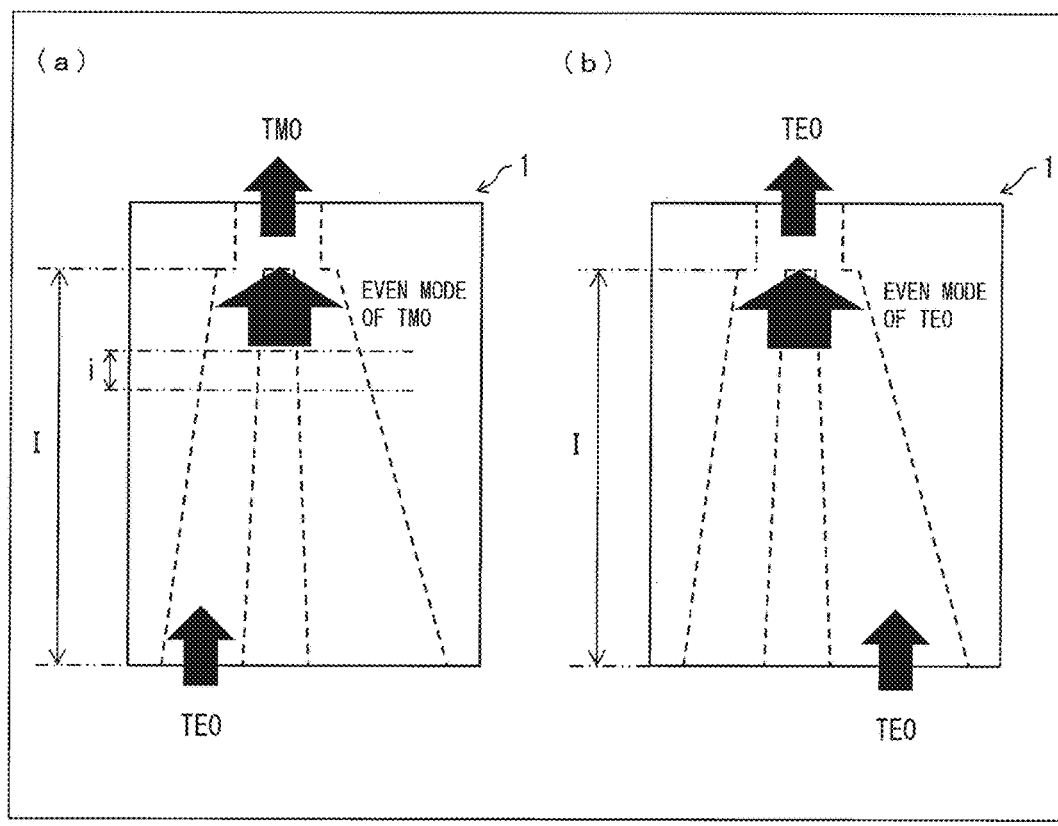

With reference to FIGS. 1 and 2, a configuration of a substrate-type optical waveguide element 1 according to the present embodiment will be described. (a) of FIG. 1 is a top view of the substrate-type optical waveguide element 1. (b) and (c) of FIG. 1 are cross-sectional views of the substrate-type optical waveguide element 1. (b) of FIG. 1 is an AA' cross-sectional view taken along line A-A' shown in (a) of FIG. 1, and (c) of FIG. 1 is a BB' cross-sectional view taken along line B-B' shown in (a) of FIG. 1. (a) and (b) of FIG. 2 are top views of the substrate-type optical waveguide element 1 for explaining functions of the substrate-type optical waveguide element 1.

As shown in (b) and (c) of FIG. 1, the substrate-type optical waveguide element 1 includes a lower cladding 12, a core 11 on the lower cladding 12, and an upper cladding 13 on the lower cladding 12, the upper cladding covering the core 11.

As shown in (a) of FIG. 1, the core 11 includes a first core 11a and a second core 11b arranged side by side, and a third core 11c having an entrance edge surface 11c1 connected to an emission edge surface 11a2 of the first core 11a and an emission edge surface 11b2 of the second core 11b.

In the description below, a section in which the first core 11a and the second core 11b are arranged side by side is called the side-by-side arrangement section I. The side-by-side arrangement section I is started in a starting point corresponding to a cross-section including entrance edge surfaces 11a1 and 11b1 of the first core 11a and the second core 11b, and is ended in the ending point corresponding to a cross-section including the emission edge surfaces 11a2 and 11b2 of the first core 11a and the second core 11b. A traveling direction of light guided through the core 11 in the side-by-side arrangement section I is defined as a z-axis positive direction. A value normalized by a length of the side-by-side arrangement section I is used as a value of a coordinate z.

The entrance edge surface 11a1 of the first core 11a serves as a first entrance port of the substrate-type optical waveguide element 1. Here, a width of the first core 11a is a width $W_a$. Particularly, a width of the entrance edge surface 11a1 is a width $W_{a1}$, and a width of the emission edge surface 11a2 a width $W_{a2}$. The width $W_{a2}$ corresponds to $W_{1out}$, which is described in the claims.

The entrance edge surface 11b1 of the second core 11b serves as a second entrance port of the substrate type optical waveguide element 1. Here, a width of the second core 11b is a width $W_b$. Particularly, a width of the entrance edge surface 11b1 is a width $W_{b1}$, and a width of the emission edge surface 11b2 is a width $W_{b2}$. The width $W_{b2}$ corresponds to $W_{2out}$, which is described in the claims.

An emission edge surface 11c2 of the third core 11c serves as an emission port of the substrate-type optical waveguide element 1. Here, a width of the third core 11c is a width $W_c$. In the present embodiment, the width $W_c$ of the third core 11c is constant from the entrance edge surface 11c1 to the emission edge surface 11c2. The width $W_c$ corresponds to $W_{3in}$, which is described in the claims.

The substrate-type optical waveguide element 1 is configured to satisfy the following requirements (1) through (4).

(1) An effective refractive index of a TE0 polarized wave guided through the entrance edge surface 11a1 of the first core 11a in the absence of the second core 11b is lower than an effective refractive index of a TE0 polarized wave guided through the entrance edge surface 11b1 of the second core 11b in the absence of the first core 11a.

(2) An effective refractive index of a TM0 polarized wave guided through the first core observed in the absence of the second core and the effective refractive index of the TE0 polarized wave guided through the second core observed in the absence of the first core are continuous as a function of a distance from the starting point of the side-by-side arrangement section.

(3) A magnitude relationship between an effective refractive index of an odd mode of a TE0 polarized wave guided through the side-by-side arrangement section I and an effective refractive index of an even mode of a TM0 polarized wave guided through the side-by-side arrangement section I is reversed between the starting point and the ending point of the side-by-side arrangement section I of the core 11.

(4) A refractive index distribution in a cross-section of the side-by-side arrangement section I is vertically asymmetrical, the cross-section being perpendicular to a direction (z-axis direction) in which light is guided, the cross-section being in an interaction section i, in which the odd mode of the TE0 polarized wave and the even mode of the TM0 polarized wave interact with each other.

In order to satisfy the requirement (1), the present embodiment defines the width $W_{a1}$ of entrance edge surface 11a1 of the first core 11a and the width $W_{b1}$ of the entrance edge surface 11b 1 of the second core 11b so that "$W_{a1} \leq W_{b1}$" is satisfied.

Further, in order to satisfy the requirement (2), the present embodiment employs such a configuration that cross-sectional shapes of the first core 11a and the second core 11b are changed continuously as the cross-sections are located closer to the ending point from the starting point in the side-by-side arrangement section 1. Specifically, the present embodiment employs such a configuration that (i) heights of the first core 11a and the second core 11b are each set to a height h and (ii) both of the width $W_a$ and the width $W_b$ are reduced continuously as the width $W_a$ and the width $W_b$ are located closer to the ending point from the starting point in the side-by-side arrangement section I.

Further, a shape of the core 11 that satisfies the requirement (3) can be determined by calculation based on simulation of (i) an effective refractive index of the odd mode of the TE0 polarized wave guided through the side -by-side arrangement section I and (ii) an effective refractive index of the even mode of the TM0 polarized wave guided through the side-by-side arrangement section I.

Further, a width $W_a(z)$ of the first core 11a in each cross-section is defined so that $W_a(z)$ becomes a continuous function having a negative slope, and a width $W_b(z)$ of the second core 11b in each cross-section is defined so that $W_b(z)$ becomes a continuous function having a negative slope. In other words, the width $W_a$ is defined to be continuously reduced from the width $W_{a1}$ to the width $W_{a2}$ as the width $W_a$ is located closer to the ending point from the starting point in the side-by-side arrangement section I, and the width $W_b$ is defined to be continuously reduced from the width $W_{b1}$ to the width $W_{b2}$ as the width $W_b$ is located closer to the ending point from the starting point in the side-by-side arrangement section I.

Further, in order to satisfy the requirement (4), the present embodiment includes a slab 11d, via which the first care 11a and the second core 11b are communicated with each other and which has a lower height than the heights of the first core 11a and the second core 11b.

Due to the slab 11d provided therein, the core 11 has a vertically asymmetric cross-sectional shape. Consequently, even in a case where the lower cladding 12 and the upper cladding 13 are made of materials having an identical refractive index, a cross-section perpendicular to the direction (the z-axis direction shown in (a) of FIG. 1) in which light is guided has a refractive index distribution that is vertically asymmetrical. In the present embodiment, the slab 11d is provided over the whole side-by-side arrangement section I. However, the present invention is not limited to such a configuration. Namely, the slab 11d only needs to be provided in the interaction section i. The interaction section i will be described later with reference to another drawing.

Note that, when the requirements (1), (3), and (4) are satisfied, the requirement (2) can alternatively be expressed as a requirement (2') below. Namely, the substrate-type optical waveguide element 1 can alternatively be expressed to be configured to satisfy the requirements (1), (2'), (3), and (4).

(2') A mode that is the odd mode of the TE0 polarized wave in the starting point of the side-by-side arrangement section I and a mode that is the even mode of the TM0 polarized wave in the starting point of the side-by-side arrangement section I are continuous as a function of a distance from the starting point, of the side-by-side arrangement section I.

As will be described later in the section "Operation Principal of Mode Conversion" with reference to FIG. 6, a mode (#1 shown in FIG. 6) that is an odd mode of a TE0 polarized wave in the starting point of the side-by-side arrangement section I becomes, out of two hybrid modes, a mode having a higher effective refractive index in the interaction section i. Then, the mode becomes a mode that is an even mode of a TM0 polarized wave in the ending point of the side-by-side arrangement section I. Similarly, a mode (#2 shown in FIG. 6) that is an even mode of a TM0 polarized wave in the starting point of the side-by-side arrangement section I becomes, out of the two hybrid modes, a mode having a lower effective refractive index in the interaction section i. Then, the mode becomes an odd. mode of a TE0 polarized wave in the ending point of the side-by-side arrangement section I.

Further, the slab 11d brings about a side effect of strengthening optical coupling between the first core 11a and the second core 11b. In a configuration without the slab 11d, most of the electric fields of light guided through the side-by-side arrangement section I are confined in the first core 11a and the second core 11b. Consequently, the optical coupling between the first core 11a and the second core 11b is not strengthened. On the other hand, in a configuration in which the core 11 includes the slab 11d, the electric fields of light guided through the side-by-side arrangement section I greatly exude, via the slab 11d, from the first core 11a toward the second core 11b and from the second core 11b toward the first core 11a. Consequently, the optical coupling between the first core 11a and the second core 11b is strengthened.

Furthermore, the slab 11d brings about another side effect of enhancing, in the ending point of the side-by-side arrangement section I, an efficiency of entrance of light from the side-by-side arrangement section I into the third core 11c. Note here that an even mode of a TM0 polarized wave entering the third core 11c after being guided through the side-by-side arrangement section I can be converted into a TM0 polarized wave to be guided through the third core 11c. Note also that, similarly, an even mode of a TE0 polarized wave entering the third core 11c after being guided through the side-by-side arrangement section I can be converted into a TE0 polarized wave to be guided through the third core 11c. Thanks to the slab 11d included therein, the substrate type optical waveguide element 1 achieves an enhanced efficiency of entrance of the even mode of the TM0 polarized wave and the even mode of the TE0 polarized wave from the side-by-side arrangement section I into the third core 11c, so that loss is reduced. This effect is achieved thanks to the slab 11d, which reduces discontinuity between the side-by-side arrangement section I and the third core 11c. In other words, this effect is achieved thanks to the slab 11d, which fills a gap between the first core 11a and the second core 11b in the side-by-side arrangement section I and accordingly allows cross-sectional shapes of the side-by-side arrangement section I and the third core 11c to approximate to each other.

A TE0 polarized wave that has entered the first entrance port of the substrate-type optical waveguide element 1 configured as above can be regarded as an odd mode of a TE0 polarized wave to be guided through the core 11. The odd mode of the TE0 polarized wave is converted into an even mode of a TM0 polarized wave in a process of being guided through the side-by-side arrangement section I, and then enters the third core 11c. The even mode of the TM0 polarized wave that has entered the third core 11c can be regarded as a TM0 polarized wave to be guided through the third core 11c. The TM0 polarized wave guided through the third core 11c is emitted from the emission port of the substrate-type optical waveguide element 1 (see FIG. 2).

Meanwhile, a TE0 polarized wave that has entered the second entrance port of the substrate-type optical waveguide element 1 can be regarded as an even mode of a TE0 polarized wave to be guided through the core 11. The even mode of the TE0 polarized wave is guided through the side-by-side arrangement section I while maintaining its mode as the even mode of the TE0 polarized wave, and then enters the third core 11c. The even mode of the TE0 polarized wave that has entered the third core 11c can be regarded as a TE0 polarized wave to be guided through the third core 11c. The TE0 polarized wave guided through the third core 11c is emitted from the emission port of the substrate-type optical waveguide element 1 (see FIG. 2).

Thus, the substrate-type optical waveguide element 1 serves as a polarization multiplexing waveguide for, in a case where individual TE0 polarized waves are respectively inputted to the first entrance port and the second entrance port, (i) converting the TE0 polarized wave that has entered the first entrance port into a TM0 polarized wave and (ii) multiplexing the TM0 polarized wave thus converted and the TE0 polarized wave that has entered the second entrance port and emitting a resultant of the multiplexing. Namely, the substrate-type optical waveguide element 1 has functions of both of the polarization rotator and the polarization beam combiner, and serves as the polarization multiplexing waveguide shown in FIG. 26.

Further, in a case where a TE0 polarized wave and a TM0 polarized wave are inputted to the emission port of the substrate-type optical waveguide element 1, the substrate-type optical waveguide element 1 outputs a TE0 polarized wave from the first entrance port, and outputs a TE0 polarized wave from he second entrance port. Thus, the substrate-type optical waveguide element 1 has the functions of both of the polarized wave beam splitter and the polarization rotator.

It is possible to manufacture the substrate-type optical waveguide element 1 by use of a lithography process and an etching process in combination. In a case where the substrate-type optical waveguide element 1 is manufactured by the lithography process, a feasible pattern accuracy, i.e., a minimum distance between the cores 11a and 11b is limited due to a wavelength of light used for exposure, for example. Even if a distance between the first core 11a and the second core 11b is set to be adequately larger than the minimum distance, optical coupling between the first core 11a and the second core 11b is strong enough to give a function of the interaction section i, since the substrate-type optical waveguide element 1 includes the slab 11d. Thus, the substrate-type optical waveguide element 1 is strong against a manufacturing deviation, and is easy to manufacture. Consequently, it is possible to reduce a manufacturing cost.

In the substrate-type optical waveguide element 1, the core 11, that is, the first core 11a, the second core 11b, the third core 11c, and the slab 11d are preferably made of a single material, more preferably made of silicon (Si). For example, use of a SOI (Silicon-On-Insulator) wafer enables to manufacture the substrate-type optical waveguide element 1 including the core 11 made of silicon. In the case of using the SOI wafer, it is possible to fabricate the core 11 by (i) forming a protective film on the SOI wafer by the lithography process and (ii) etching a silicon layer formed on a BOX layer (Buried Oxide Layer) twice.

Further, in this case, silica (SiO2), which is a material of the BOX layer of the SOI wafer, may be used as the lower cladding 12. Namely, in this case, the lower cladding 12 made of silica is employed.

The upper cladding 13 can be formed by laminating a material having a suitable refractive index on the lower cladding 12 in such a manner that the core 11 is buried in the material. The substrate-type optical waveguide element 1 has a refractive index distribution that is asymmetrical due to the slab 11d. Therefore, even in a case where the lower cladding 12 and the upper cladding 13 made of an identical material are used, it is possible to satisfy the above-described requirement (4). In order to employ the upper cladding 13 that is made of silica as well as the lower cladding 12, a silica film may be laminated on the lower cladding 12 in such a manner that the core 11 is buried in the silica film.

In a case where the lower cladding 12 and the upper cladding 13 are made of different materials, a difficulty level of the manufacturing process may possibly be increased or a yield rate may possibly be reduced due to, e.g., a difference in a coefficient of linear expansion between the materials. On the other hand, by employing the lower cladding 12 and the upper cladding 13 made of an identical material, it is possible to avoid such problems.

The following describes a more preferable configuration of the substrate-type optical waveguide element 1.

In the substrate-type optical waveguide element 1, the emission edge surface 11a2 of the first core 11a and the emission edge surface 11b2 of the second core 11b are preferably apart from each other.

In a case of manufacturing a configuration in which lateral sides of the first core 11a and the second core 11b are in contact with each other in the ending point of the side-by-side arrangement section I, i.e., the asymmetric Y-branching structure described in Non-Patent Literature 2, a branching point of a Y character-part cannot be made as precisely as in (a) of FIG. 27. Instead, a round branching point of a Y character-part as those shown in (b) of FIG. 27 is made. This happens because depiction of a waveguide structure, which is mainly performed by the lithography, is limited due to a resolution limit during the manufacturing of the substrate-type optical waveguide. In the case where the round branching point is made, an abrupt change occurs in an electric field distribution of light guided to such a branching point. This causes light scattering, resulting in an increase in the loss. This is not preferable in terms of energy efficiency.

With the configuration in which the lateral sides of the first core 11a and the second core 11b are apart from each other in the ending point of the side-by-side arrangement section I, a width of a part of the slab 11d which part corresponds to the ending point of the side-by-side arrangement section I can be set to be adequately large relative to a possible minimum distance between the cores 11a and 11b that can be made by the lithography process and the etching process. Therefore, with the substrate-type optical waveguide element 1, it is possible to reduce an deviation of a shape of the part of the slab 11d which part corresponds to the ending point of the side-by-side arrangement section I, so as to reduce the loss caused by the deviation in the shape.

The emission edge surface 11a2 of the first core 11a and the emission edge surface 11b2 of the second core 11b are preferably congruent with each other. Further, a cross-section of the core 11 which cross-section is located in an entrance side of the ending point of the side-by-side arrangement section I preferably has a horizontally symmetric shape, and a cross-section of the core 11 which cross-section is located in an emission side of the ending point of the side-by-side arrangement section I preferably has a horizontally symmetric shape. Furthermore, a symmetric axis of the cross-section of the core 11 which cross-section is located in the entrance side of the ending point of the side-by-side arrangement section I and a symmetric axis of the cross-section of the core 11 which cross-section is located in the emission side of the ending point of the side-by-side arrangement section I preferably coincide with each other.

The cross-section of the core 11 in the ending point (z=1) of the side-by-side arrangement section I can be made horizontally symmetrical by configuring the emission edge surface 11$a$2 and the emission edge surface 11$b$2 to have shapes of rectangles (quadrangles) or isosceles trapezoids. that are congruent with each other and configuring the slab 11$d$ to have a constant height. In such a configuration the cross-section of the core 11 in the ending point (z=1) of the side-by-side arrangement section I is horizontally symmetrical with respect to a symmetric axis that is a straight line parallel to a height direction of the core 11, the straight line extending through a point at which the width of the core 11 is divided into two equal parts.

Further, the entrance edge surface 11$c$1 can be made horizontally symmetrical by configuring the entrance edge surface 11$c$1 to have a shape of a rectangle (quadrangle) or an isosceles trapezoid. In this case, the entrance edge surface 11$c$1 is horizontally symmetrical with respect to a symmetric axis that is a straight line parallel to the height direction of the core 11, the straight line extending through a point at which the width $W_c$ of the third core 11$c$ is divided into two equal parts. According to the substrate-type optical waveguide element 1 configured as above, the symmetric axis of the cross-section of the core 11 which cross-section is located in the ending point of the side-by-side arrangement section I coincides with the symmetric axis of the entrance edge surface 11$c$1 of the third core 11$c$.

With the above configuration, the loss and the crosstalk can be reduced. The reasons for this will be described below.

Since the emission edge surface 11$a$2 and the emission edge surface 11$b$2 are congruent with each other, optical coupling between the cores 11$a$ and 11$b$ adjacent to each other is strengthened. Thus, an electric field distribution of light guided through the side-by-side arrangement section I of the core 11 expands into a portion between the first core 11$a$ and the second core 11$b$, i.e., into the slab 11$d$. This is because the phase matching condition is satisfied when the emission edge surface 11$a$2 and the emission edge surface 11$b$2 are congruent with each other (see Non-Patent Literature 4).

In addition, since the part of the core 11 which part corresponds to the entrance side of the ending point of the side-by-side arrangement section I has a horizontally symmetric cross-sectional shape and the part of the core 11 which part corresponds to the emission side of the ending point of the side-by-side arrangement section I has a horizontally symmetric cross-sectional shape, each of an even mode of a TE0 polarized wave and an even mode of a TM0 polarized wave of the core 11 forms, in the side-by-side arrangement section I, a horizontally symmetric electric field distribution on a cross-section of the substrate-type optical waveguide element 1, the cross-section being in the side-by-side arrangement section I, the cross-section being perpendicular to the traveling direction of light.

Furthermore, the symmetric axis of the cross-section of the core 11 which cross-section is located in the entrance side of the ending point of the side-by-side arrangement section I and the symmetric axis of the cross-section of the core 11 which cross-section is located in the emission side of the ending point of the side-by-side arrangement section I coincide with each other. Therefore, an electric field distribution of an even mode of a TE0 polarized wave observed in the side-by-side arrangement section I largely overlaps an electric field distribution of a TE0 polarized wave observed in the third core 11$c$, and an electric field distribution of an even mode of a TM0 polarized wave in the core 11 observed in the side-by-side arrangement section I largely overlaps and an electric field distribution of a TM0 polarized wave observed in the third core 11$c$. This enhances an optical coupling efficiency between the waveguide mode of the core 11 in the side-by-side arrangement section I and the waveguide mode of the third core 11$c$. Consequently, the loss is reduced.

Here, the following discusses what will happen in the first core 11$a$ and the second core 11$b$ in a case where an odd mode of a TE0 polarized wave occurring as a result of inputting a TE0 polarized wave into the first input port is not adequately converted into an even mode of a TM0 polarized wave by the side-by-side arrangement section I. In this case, a residual odd mode of a TE0 polarized wave resulting from the inadequate conversion reaches the ending point of the side-by-side arrangement section I. At this time, in some cases, the residual odd mode of the TE0 polarized wave may enter the third core 11$c$ from the side-by-side arrangement section I. The residual odd mode of the TE0 polarized wave that has entered the third core 11$c$ may possibly be converted into a TE0 polarized wave to be guided through the third core 11$c$. In such a case, the TE0 polarized wave thus converted may be outputted from the output port with the TE0 polarized wave mixed with a TE0 polarized wave that has been inputted to the second input port. This leads to the crosstalk, and therefore is not preferable.

However, the residual odd mode of the TE0 polarized wave has a horizontally antisymmetric electric field distribution. Therefore, overlapping of the residual odd mode of the TE0 polarized wave and the TE0 polarized wave of the third core 11$c$ is small. Theoretically, based on the formula (3) discussed later, integral of the overlapping of the antisymmetric electric field distribution of the odd mode of the TE0 polarized wave and the symmetric electric field distribution of the TE0 polarized wave yields 0.

Consequently, a coupling efficiency between the odd mode of the TE0 polarized wave guided through the side-by-side arrangement section I and the TE0 polarized wave of the third core 11$c$ is reduced. As a result, according to the substrate-type optical waveguide element 1, the above-described crosstalk is reduced.

Note that the "rectangle (quadrangle)" herein encompasses not only a rectangle (quadrangle) in a strict sense but also a shape resulting from an attempt to form a rectangle (quadrangle) in a manufacturing process of the substrate-type optical waveguide element 1. Herein, the shape resulting from the attempt to form the rectangle (quadrangle) is referred to as a "quasi-rectangle (quasi-quadrangle".

It is possible to form the core 11 made of silicon, e.g., by means of an etching process such as RIE (Reactive Ion Etching). According to the etching process, in some cases, an angle made by a lateral surface of the core 11 that has been formed and a line perpendicular to a surface of the lower cladding 12 may not be 0°, and the lateral surface may be inclined slightly (specifically, not more than ±5°). Further, according to the etching process, in some cases, an apex of the core 11 that has been formed may have an obtuse angle. Each of the rectangle-like shape having a slightly inclined lateral surface and the rectangle-like shape having an apex having an obtuse angle corresponds to the quasi-rectangle.

The "isosceles trapezoid" herein refers to an isosceles trapezoid having a pair of parallel sides, one of which is a bottom side having both ends whose internal angles are each not greater than 85°. Herein, a shape resulting from an attempt to form the isosceles trapezoid is referred to as a "quasi-isosceles trapezoid". For example, an isosceles trapezoid-like shape having an apex having an obtuse angle corresponds to the quasi-isosceles trapezoid. Note that an isosceles trapezoid having internal angles of greater than 85° and not greater than 90° is encompassed in the above-described quasi-rectangle.

Further, the substrate-type optical waveguide element 1 is preferably configured such that a width $W_{a2}$ of the emission edge surface 11a2 of the first core 11a, a width $W_{b2}$ of the emission edge surface 11b2 of the second core 11b, and a width $W_c$ of the entrance edge surface of the third core 11c satisfy $W_{a2}$±the width $W_{b2}$>the width $W_c$. Here, the width $W_{a2}$, the width $W_{b2}$, and the width $W_c$ respectively correspond to a width $W_{1out}$, a width $W_{2out}$, and a width $W_{3in}$ described in the claims.

As described above, the electric field distribution of the light guided through the side-by-side arrangement section I of the core 11 expands into the portion between the first core 11a and the second core 11b. Reducing the width $W_c$ of the third core 11c enables to reduce respective widths of the electric field distributions of the TM0 polarized wave and the TE0 polarized wave of the third core 11c. Thus, with the above configuration, it may be possible to increase a proportion of overlapping of (i) an electric field distribution of an even mode of a TM0 polarized wave collected in the portion between the first core 11a and the second core 11b and (ii) an electric field distribution of a TM0 polarized wave of the third core 11c (see (3)). Similarly, with the above configuration, it may be possible to increase a proportion of overlapping of (i) an electric field distribution of an even mode of a TE0 polarized wave collected in the portion between the first core 11a and the second core 11b and (ii) an electric field distribution of a TE0 polarized wave of the third core 11c (see (3)). With the substrate-type optical waveguide element 1 in which these overlappings are increased, it is possible to further reduce the loss occurring in the ending point of the side by-side arrangement section I.

As shown in (a) of FIG. 1, preferably, distance between the first care 11a and the second core 11b is gradually reduced as the distance is located closer to the ending point (z=1) from the starting point (z=0) in the side -by-side arrangement section I. In other words, in the starting point of the side-by-side arrangement section I, the entrance edge surface 11a1 of the first core 11a and the entrance edge surface 11b1 of the second core 11b are preferably apart from each other to a degree that does not allow occurrence of an interaction therebetween. In the ending point of the side-by-side arrangement section I, the emission edge surface 11a2 of the first core 11a and the emission edge surface 11b2 of the second core 11b are preferably disposed so as to be close to each other in a degree that allows occurrence of an adequate interaction therebetween.

While the first core 11a and second core 11b apart from each other, optical coupling between a waveguide mode of the first core 11a and a waveguide mode of the second core 11b is weak, as described in Non-Patent Literature 4. If the optical coupling is weak, one of adjacent cores is less affected by the other, and an electric field distribution of a supermode approximates to an electric field, distribution observed when each of the cores 11a and 11b exist alone. Namely, an electric field distribution of an odd mode of a TE0 polarized wave in the first input port approximates to an electric field distribution of a TE0 polarized wave of the first core 11a observed when the first core 11a exists alone. Meanwhile, an electric field distribution of an even mode of a TE0 polarized wave in the second input port approximates to an electric field distribution of a TE0 polarized wave of the second core 11b observed when the second core 11b exists alone.

Cores of external waveguides respectively connected to the first entrance port and the second entrance port can be regarded as existing alone. Therefore, by configuring the first entrance port and the second entrance port so as to be adequately apart from each other, it is possible to enhance a conversion efficiency in mode conversion of TE0 polarized waves inputted from the cores of the external waveguides, into a supermode of the first core 11a and the second core 11b. In other words, it is possible to further reduce the loss occurring in inputting the TE0 polarized waves from the cores of the external waveguides to the first core 11a and the second core 11b.

In order to satisfy the requirement (4), the present embodiment employs the core 11 including the slab 11d. However, the present invention is not limited to such a configuration. Namely, in order to satisfy the requirement (4), instead of the configuration including the slab 11d, a configuration including a first core 11a and a second core 11b each having a vertically asymmetric cross-sectional shape may alternatively be employed. Further alternatively, a configuration including a lower cladding 12 and an upper cladding 13 made of materials having different refractive indexes may be employed. In the latter case, materials having different refractive indexes may be used to form the lower cladding 12 and the upper cladding 13, in order that the lower cladding 12 and the upper cladding 13 have different refractive indexes. Alternatively, an air layer having a different refractive index from that of a lower cladding 12 may be used as an upper cladding 13, i.e., the lamination of the upper cladding 13 on the lower cladding 12 may not be performed.

Although the present embodiment includes the slab 11d that is provided over the whole side-by-side arrangement section I, the present invention is not limited to such a configuration. Namely, in order to satisfy the requirement (4), the slab 11d only needs to be formed at least in the interaction section i, in which an odd mode of a TE0 polarized wave guided through the side-by-side arrangement section I and an even mode of a TM0 polarized wave guided through the side-by-side arrangement section I interact with each other.

(Operation Principal of Mode Conversion)

Satisfying the requirement (1) allows a TE0 polarized wave inputted to the first input port to be converted into an odd mode of a TE0 polarized wave in the core 11, i.e., in a cross-section including the first core 11a and the second core 11b, and allows a TE0 polarized wave inputted to the second input port to be converted into an even mode of a TE0 polarized wave in the cross-section including the first core 11a and the second core 11b. In other words, the TE0 polarized wave inputted to the first input port can be regarded as the odd mode of the TE0 polarized wave to be guided through the core 11, and the TE0 polarized wave inputted to the second input port can be regarded as the even mode of the TE0 polarized wave to be guided through the core 11. The reasons for this will be described below.

The following description will be made based on Non -Patent Literature 4, pp. 526-531 (13.9 THE EIGEN-MODES OF A COUPLED WAVEGUIDE SYSTEM (supermodes)).

According to Non-Patent Literature 4, in a case where two cores 11a and 11b are disposed so as to be adjacent to each other, a certain waveguide mode of the core 11a is coupled to a certain waveguide mode of the core 11b. This results in a waveguide mode having an electric field distribution spreading over a whole cross-section of a core 11 including the two cores 11a and 11b. Such an electric field distribution is called a "supermode". The supermode has (i) an even mode in which the adjacent cores 11a and 11b have electric field distributions in an identical phase and (ii) an odd mode in which the adjacent cores 11a and 11b have electric field distributions in opposite phases.

According to Non-Patent Literature 4, a proportion of an electric field of the supermode existing over the whole core 11 is determined by a matching rate between effective refractive indexes of TE0 polarized waves of the cores 11a and 11b adjacent to each other observed when the cores 11a and 11b exist alone. As the effective refractive indexes match more, the proportion of the electric field existing over the adjacent cores 11a and 11b increases. On the contrary, in a case where these effective refractive indexes do not match, the electric field exhibits its distribution being localized in one of the cores (for example, in the core 11a). In a case where the requirement (1) is satisfied, the electric field exhibits the distribution being localized in one of the cores, since there is a difference between the effective refractive indexes of the TE0 polarized waves in the first input port and the second input port observed when the cores 11a and 11b exist alone. The electric field distribution observed in this case is more similar to the electric field distribution of the TE0 polarized wave observed when the cores 11a and 11b exist alone.

Further, as disclosed by Non-Patent Literature 4, the odd mode always has a lower effective refractive index than that of the even mode. Therefore, in a case where the requirement (1) is satisfied, an electric field distribution of an odd mode of a TE0 polarized wave in the cross-sections of the first input port and the second input port approximates to an electric field distribution of a TE0 polarized wave observed when the first core 11a exists alone, and an electric field distribution of an even mode of a TE0 polarized wave in the cross-sections of the first input port and the second input port approximates to an electric field distribution of a TE0 polarized wave observed when the second core 11b exists alone. Thus, a TE0 polarized wave inputted to the first input port of the first core 11a is converted into an odd mode of a TE0 polarized wave, and a TE0 polarized wave inputted to the second input port of the second core 11b is converted into an even mode of a TE0 polarized wave.

These conversions are performed in each of the cross-sections of the first input port and the second input port, and therefore do not substantially lead to an increase in a device length.

As a means to satisfy the requirement (1), employing the first core 11a and the second core 11b having different core areas may be possible. The larger the core area becomes, the stronger an electric field distribution is confined in the core.

Consequently, a refractive index of the core is effected stronger, and this results in an increase in the effective refractive index. Namely, the larger the core area becomes, the higher the effective refractive index becomes. Therefore, by configuring, in the cross-section including the first input port and the second input port, the first core 11a to have a smaller core area than the second core 11b, it is possible to satisfy the requirement (1).

By satisfying the requirements (3) and (4), an odd mode of a TE0 polarized wave in the cross-section including the first input port and the second input port is adiabatically converted into an even mode of a TM0 polarized wave in a connection surface. This will be described in detail below with reference to a concrete example.

Figure 7:
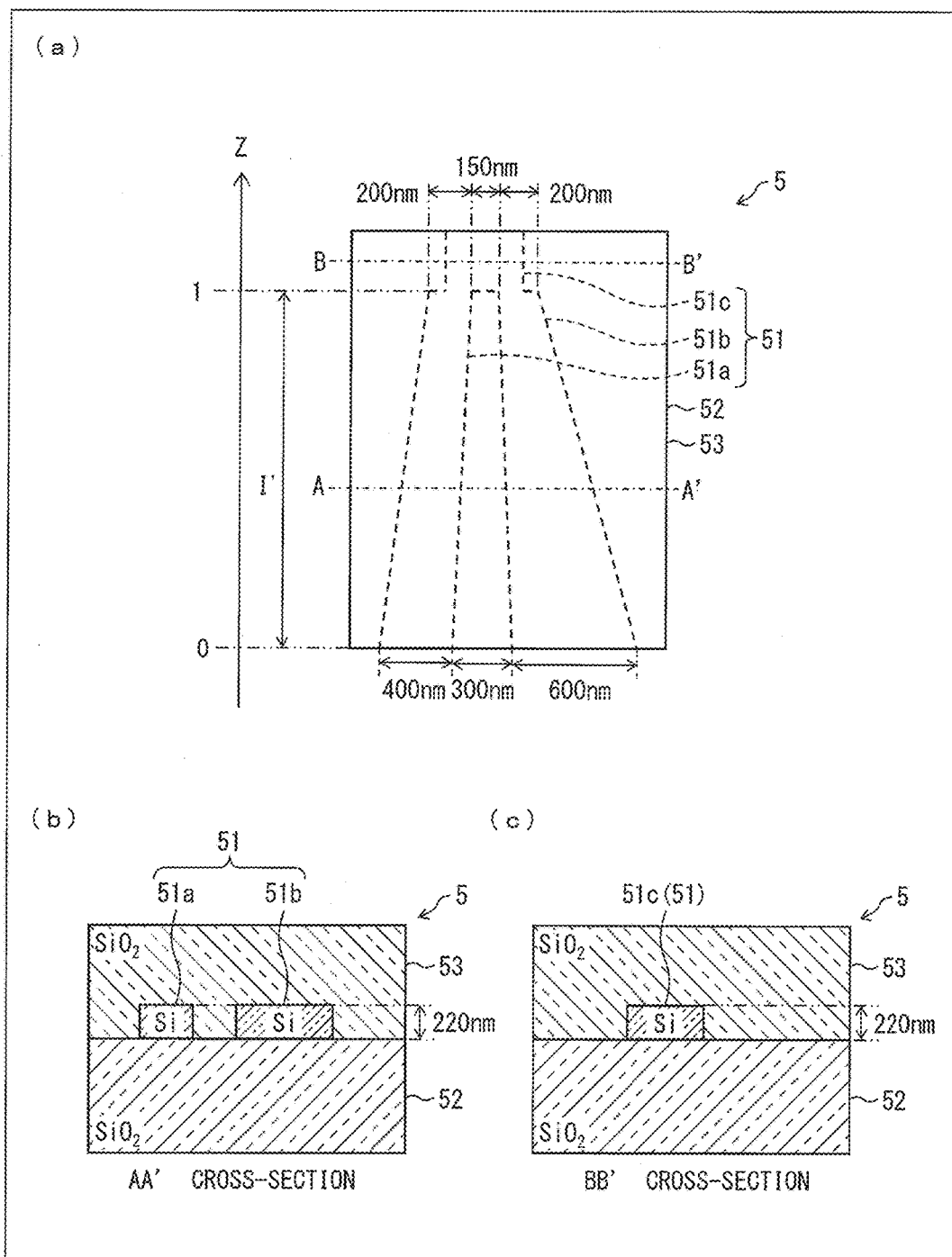
Figure 8:
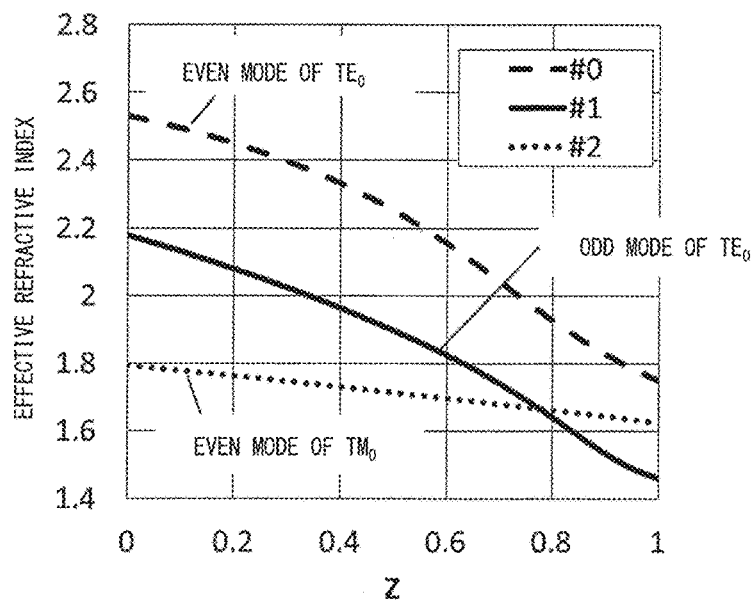

First, the following will discuss a case where the requirement (3) is satisfied but the requirement (4) is not satisfied. Namely, discussed below is a case where a refractive index distribution in the cross-section of the interaction section i is vertically symmetrical. Here, the description will be made with reference to a substrate-type optical waveguide element 5 shown in FIG. 7, which is a comparative example to the substrate-type optical waveguide element 1. Further, FIG. 8 shows a result of calculation of effective refractive indexes of respective modes in a cross-section perpendicular to a traveling direction (the z-axis direction shown in FIG. 7) of light that is guided through a side-by-side arrangement section I' of the substrate-type optical waveguide element 5 according to the comparative example. FIG. 8 shows an even mode of a TE0 polarized wave (#0), an odd mode of a TE0 polarized wave (#1), and an even mode of a TM0 polarized wave (#2).

FIG. 8 shows that a magnitude relationship between an effective refractive index of the odd mode of the TE0 polarized wave and an effective refractive index of the even mode of the TM0 polarized wave was reversed between a starting point (z=0) and an and ending point (z=1) of the side-by-side arrangement section I'.

Further, FIG. 8 also shows that an effective refractive index of the odd mode of the TE0 polarized wave and an effective refractive index of the even mode of the TM0 polarized wave were equal to each other in a certain cross -section of the side-by-side arrangement section I', i.e., a cross-section corresponding to "z" in a range of 0<z<1.

Here, the cross-section in which the effective refractive index of the odd mode of the TE0 polarized wave and the effective refractive index of the even mode of the TM0 polarized wave are equal to each other is referred to as a "degenerate surface". According to FIG. 8, a degenerate surface of the substrate-type optical waveguide element 5 was in the vicinity of z=0.75.

Next, the following will discuss a case where the requirement (4) is satisfied, i.e., the substrate-type optical waveguide element 1 of the present embodiment. The refractive index is vertically asymmetric in the cross section of the side-by-side arrangement section I, the cross-section being perpendicular to the z-axis direction. Therefore, in the vicinity of the degenerate surface between the odd mode of the TE0 polarized wave and the even mode of the TM0 polarized wave, these waveguide modes interact with each other. Consequently, in the interaction section i, the odd mode of the TE0 polarized wave and the even mode of the TM0 polarized wave form mixed waveguide modes that are called two hybrid modes.

As a result, the effective refractive indexes of the odd mode of the TE0 polarized wave and the even mode of the TM0 polarized wave, which were equal to each other in the degenerate surface, are no longer equal to each other. Thus, along the traveling direction (the z-axis positive direction) of light, the effective refractive index of the odd mode of the TE0 polarized wave in the starting point of the side-by-side arrangement section I is connected continuously to the effective refractive index of the even mode of the TM0 polarized wave in the ending point of the side-by-side arrangement section I via an effective refractive index of, out of the two hybrid modes, a hybrid mode having a higher effective refractive index (see #1 shown in FIG. 6). Similarly, along the traveling direction of light, the effective refractive index of the even mode of the TM0 polarized wave in the starting point of the side-by-side arrangement section I is connected continuously to the effective refractive index of the odd mode of the TE0 polarized wave in the ending point of the side-by-side arrangement section I via an effective refractive index of, out of the two hybrid modes, a hybrid mode having a lower effective refractive index (see #2 shown in FIG. 6). Note that a concrete configuration of the substrate-type optical waveguide element 1 used to calculate the effective refractive indexes shown in FIG. 6 will be described in an embodiment to be described next.

It is known that gently changing a waveguide structure between two waveguide modes having effective refractive indexes continuously connected to each other enables mode conversion involving quite small loss. The conversion involving the small loss is called "adiabatic conversion". Therefore, by satisfying the requirements (3) and (4), the odd mode of the TE0 polarized wave in the cross-section of the side-by-side arrangement section I is adiabatically converted into the even mode of the TM0 polarized wave in the connection plane.

According to the description of Non-Patent Literature 5, in a case where a waveguide includes (i) a core shaped in a quadrangle and (ii) a lower cladding 12 and an upper cladding 13 having different refractive indexes, $TM_{11}$ and $TE_{21}$ among first three modes (denoted as $TE_{11}$, $TM_{11}$, and $TE_{21}$ in Non-Patent Literature 5) of the core interact with each other. The first three modes herein refer to three modes having high effective refractive indexes among the waveguide modes.

Here, the following two points are focused.

The first point is as follows. That is, the odd mode of the TE0 polarized wave of the substrate-type optical waveguide element 1 corresponds to $TE_{21}$ of Non-Patent Literature 5, and the even mode of the TM0 polarized wave of the substrate-type optical waveguide element 1 corresponds to $TM_{11}$ of Non-Patent Literature 5. Assuming that adjacent cores are regarded as a single core, the supermode corresponds to a waveguide mode in the single core. Therefore, in the single core, an odd mode of a TE0 polarized wave that has a second highest effective refractive index among the TE polarized waves corresponds to $TE_{21}$ of Non-Patent Literature 5, which is defined in a similar way. Meanwhile, an even mode of a TM0 polarized wave that has a highest effective refractive index among the TM polarized waves corresponds to $TM_{11}$ of Non-Patent Literature 5, which, is defined in a similar way.

The second point is as follows. Non-Patent Literature 5 discloses a case where the upper cladding 13 and the lower cladding 12 have different refractive indexes. However, according to the formula (1) in Non-Patent Literature 5, which expresses a strength of interaction between two waveguide modes, it is only necessary that the refractive index distribution be vertically asymmetrical.

Therefore, satisfying the requirements (3) and (4) allows the odd mode of the TE0 polarized wave and the even mode of the TM0 polarized wave to interact with each other. Therefore, according to the substrate-type optical waveguide element 1, the odd mode of the TE0 polarized wave in the cross-section of the starting point of the side-by-side arrangement section I is adiabatically converted into the even mode of the TM0 polarized wave in the cross-section of the ending point of the side-by-side arrangement section I.

On the other hand, the even mode of the TE0 polarized wave does not interact with any mode of the single core. Therefore, while being guided through the side-by-side arrangement section I, the even mode of the TE0 polarized wave is not converted into any other mode.

In order to satisfy the requirements (2) and (3), along the traveling direction (the z-axis positive direction shown in (a) of FIG. 1) of light, the widths of the first core 11a and the second core 11b may be changed continuously. Due to boundary conditions for an electric field at a core-cladding interface, the effective refractive index of the TE polarized wave is more sensitive to a change in the width of the core (the width $W_a$ and the width $W_b$ of the substrate-type optical waveguide element 1) than the effective refractive index of the TM polarized wave. Namely, along with changes in the width $W_a$ and the width $W_b$, the effective refractive index of the TE polarized wave changes more greatly than the effective refractive index of the TM polarized wave. Therefore, by changing the width of the core continuously, it is possible to cause the magnitude relationship between the effective refractive index of the odd mode of the TE0 polarized wave and the effective refractive index of the even mode of the TM0 polarized wave to be reversed between the starting point and the ending point of the side-by-side arrangement section I.

Meanwhile, the TM polarized wave is more sensitive to a change in the height of the core (the height h in the substrate-type optical waveguide element 1) than the TE polarized wave. Namely, along with a change in the height h, the effective refractive index of the TM polarized wave changes more greatly than the effective refractive index of the TE polarized wave.

Therefore, instead of the configuration in which the width $W_a$ and the width $W_b$ are reduced as the width $W_a$ and the width $W_b$ are located closer to the ending point from the starting point in the side-by-side arrangement section I, a configuration in which the height h is increased as the height h is located closer to the ending point from the starting point in the side-by-side arrangement section I may alternatively be employed. With the configuration in which the height h is changed, as well as with the configuration in which the width $W_a$ and the width $W_b$ are changed, it is possible to provide a side-by-side arrangement section I including a degenerate surface at any position in a range of 0<z<1.

Further alternatively, the following configuration may be employed, That is, according to the further alternative configuration, (1) a first entrance port and a second entrance port respectively have, in a starting point of a side-by-side arrangement section I, cross-sectional shapes that cause each of effective refractive indexes of an even mode of a TM0 polarized wave and an odd mode of a TM0 polarized wave to be higher than effective refractive indexes of an even mode of a TE0 polarized wave and an odd mode of a TE0 polarized wave, and (2) a height h is reduced as the height h is located closer to an ending point. from the starting point in the side-by-side arrangement section I. Such a configuration also provides the side-by-side arrangement section I including a degenerate surface at any position in a range of 0<z<1.

EXAMPLE

Figure 5:
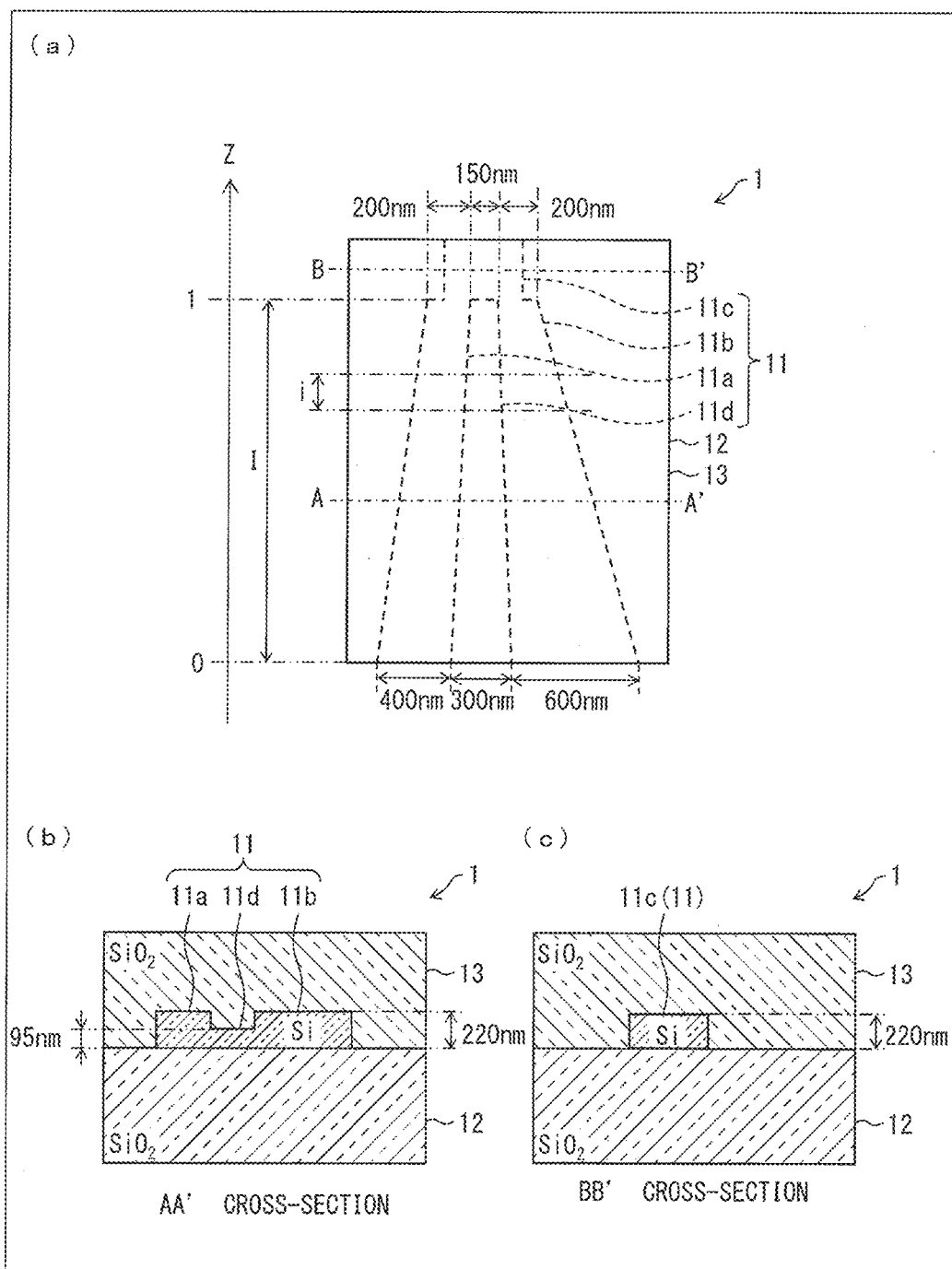

In order to describe the above-described mode conversion more concretely, the following will describe a substrate-type optical waveguide element 1 according to an example of the present invention with reference to FIG. 5. (a) of FIG. 5 is a top view of the substrate-type optical waveguide element 1 of the present example. (b) and (c) of FIG. 5 are cross-sectional views illustrating the substrate-type optical waveguide element 1 of the present example. (b) of FIG. 5 is an AA' cross-sectional view taken along line A-A' shown in (a) of FIG. 5, and (c) of FIG. 5 is a BB' cross-sectional view taken along line B-B' shown in (a) of FIG. 5.

The substrate-type optical waveguide element 1 of the present example has a similar configuration to that of the substrate-type optical waveguide element 1 of the first embodiment, and includes the elements whose sizes were defined as below.

Concretely, as shown in (a) of FIG. 5, in a starting point of the side-by-side arrangement section I, a width of a first core 11a (a width of a first entrance port) is defined as 400 nm, and a width of a second core 11b (a width of a second entrance port) is defined as 600 nm. In the ending point of the side-by-side arrangement section I, a width of the first core 11a is defined as 200 nm, and a width of the second core 11b is defined as 200 nm. A distance between the first core 11a and the second core 11b is defined as 300 nm in the starting point of the side-by-side arrangement section I, and is defined as 150 nm in the ending point of the side-by-side arrangement section I. A width of a third core 11c is defined as 400 nm.

Further, as shown in (b) and (c) of FIG. 5, heights of the first core 11a, the second core 11b, and the third core 11c are each defined as 220 nm. Meanwhile, a height of slab 11d is defined as 95 nm.

Figure 6:
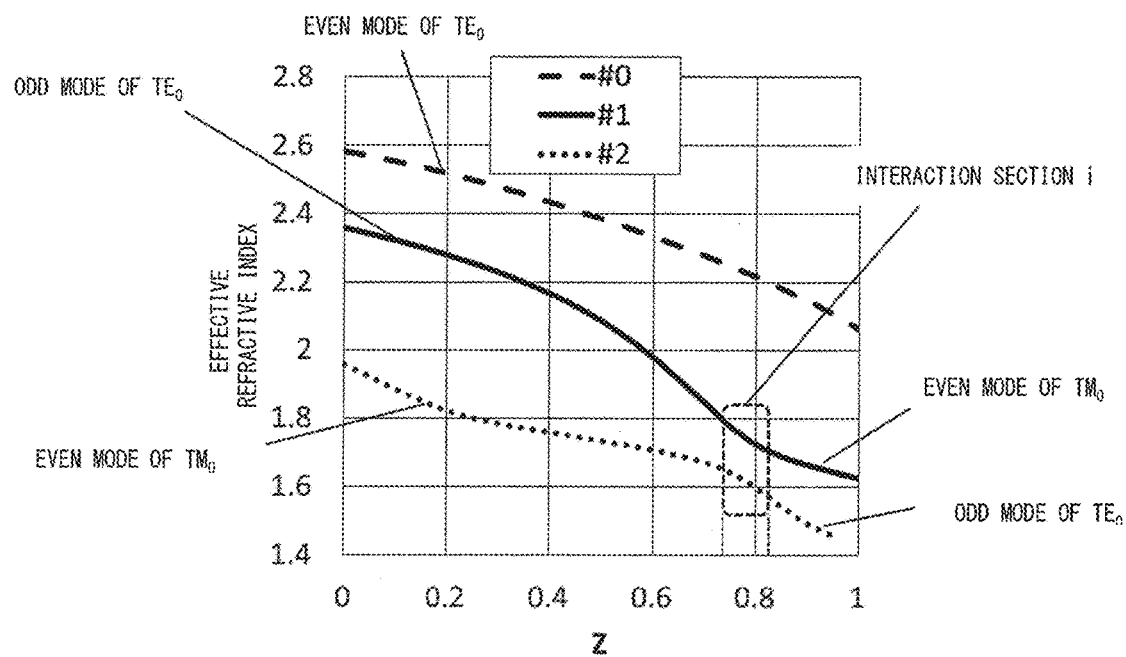

Next, with reference to FIG. 6, the following describes an effective refractive index of the substrate-type optical waveguide element 1 of the present example, the effective refractive index being observed in the side-by-side arrangement section I. FIG. 6 is a graph showing a result of calculation of effective refractive indexes in cross-sections of the side by-side arrangement section I (0≤z≤1), the cross-sections being along a z-axis direction.

FIG. 6 shows the result of the calculation of the effective refractive indexes of three modes (#0, #1, #2 in the order), which are indicated in a descending order of the effective refractive index. According to FIG. 6, curves of effective refractive index of an odd mode of a TE0 polarized wave and an even mode of a TM0 polarized wave were apart from each other in the substrate-type optical waveguide element 1 of the present example, although these curves crossed each other in the substrate-type optical waveguide element 5 of the comparative example (see FIG. 8). This shows that the odd mode of the TE0 polarized wave in the starting point (z=0) of the side-by-side arrangement section I changed along the continuously-connected curve (#1) of the effective refractive index, so as to be connected to the even mode of the TM0 polarized wave in the ending point (z=1) of the side-by-side arrangement section I. This shows that gently changing the widths of the cores 11a and 11b along a z-axis positive direction allows adiabatic mode conversion from the odd mode of the TE0 polarized wave into the even mode of the TM0 polarized wave.

Figure 9:
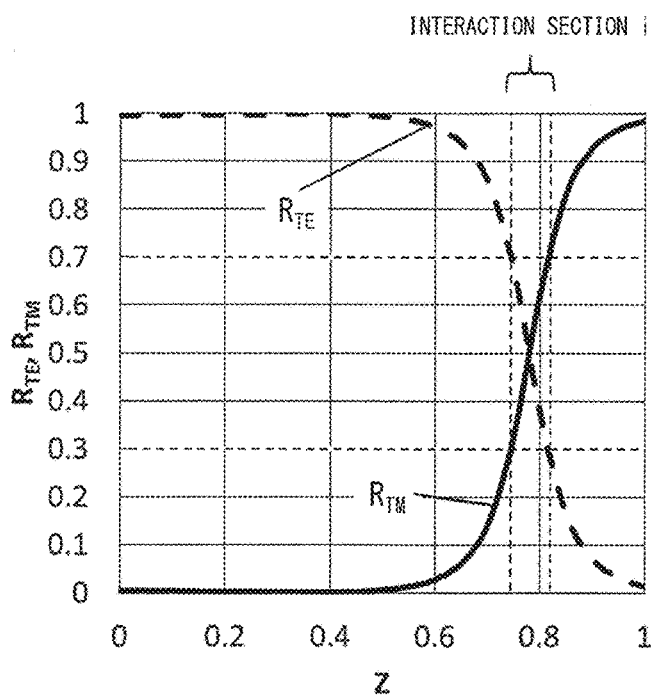
FIG. 9 is a graph showing a result of numerical calculation of an electric field component in an x-direction and an electric field component in a y-direction of a waveguide mode #1 shown in FIG. 6, the numerical calculation having performed along the z-direction, which is the traveling direction of light.

In order to further study the conversion of the waveguide mode #1, FIG. 9 shows a result of calculation of electric power proportions of an electric field component (Ex) in a width direction (x-direction) and an electric field component (Ey) in a height direction (y-direction) of the waveguide mode #1.

The values $R_{TE}$ and $R_{TM}$ in FIG. 9 are defined as below, and denote proportions of normalized Ex and Ey components, respectively.

$$R_{TE} = \frac{\left|\int_S E_x H_y ds\right|}{\left|\int_S E_x H_y ds\right| + \left|\int_S E_y H_x ds\right|} \quad (1)$$

$$R_{TM} = \frac{\left|\int_S E_y H_x ds\right|}{\left|\int_S E_x H_y ds\right| + \left|\int_S E_y H_x ds\right|} \quad (2)$$

Here, Hx denotes a magnetic field component in the width direction, and Hy denotes a magnetic field component in the height direction. Integration is performed with respect to a whole plane including the width direction and the height direction.

In a waveguide mode in which Ex is dominant, Hy is dominant. A value of integral of a product of an electric field component and a magnetic field component has an electric power dimension. Therefore, $R_{TE}$ denotes electric power proportion of Ex with respect to a total electric power. Similarly, $R_{TM}$ denotes an electric power proportion of Ey with respect to the total electric power.

Herein, a section satisfying "$0.3<R_{TE}<0.7$" and "$0.3<R_{TM}<0.7$" is defined as an interaction section i. Further, waveguide modes therein are defined as hybrid modes.

FIG. 9 shows that Ex was a main component in the starting point (z=0) of the side-by-side arrangement section I, and then the main component was continuously converted into Ey through the interaction section i, so that Ey became the main component in the connection plane. This also shows that a polarized direction of light guided through the side-by-side arrangement section I was rotated.

As described above, satisfying the requirement (4) allows the odd mode of the TE0 polarized wave and the even mode of the TM0 polarized wave to interact with each other. This enables mode conversion between the odd mode of the TE0 polarized wave and the even mode of the TM0 polarized wave.

(Effects Given by Configuration in which First Core 11a and Second Core 11b are Apart from Each Other in Ending Point of Side-by-Side Arrangement Section)

In the connection plane, the first core 11a, the second core 11b, and the third core 11c are connected with each other by abutting and bonding. In a cross-section thereof, a super-mode of the first core 11a and the second core 11b is converted into a waveguide mode of the third core 11c.

A conversion efficiency achieved by the abutting and bonding can be expressed approximately by the following formula (3).

$$\eta = C|\int (E_x^{WG1,2} \times E_x^{WG3} + E_y^{WG1,2} \times E_y^{WG3}) dS|^2 \quad (3)$$

The parameters in the above formula are as below.

$E_x^{WG1,2}$:

An x-component in an electric field of a waveguide mode of the core 11, observed on the entrance side of the ending point of the side-by-side arrangement section I.

$E_y^{WG1,2}$:

A y-component in the electric field of the waveguide mode of the core 11, observed on the entrance side of the ending point of the side-by-side arrangement section I.

$E_x^{WG3}$:

An x-component in the electric field of the waveguide mode of the core 11, observed on the emission side of the ending point of the side-by-side arrangement section I.

$E_y^{WG3}$:

A y-component in the electric field of the waveguide mode of the core 11, observed on the emission side of the ending point of the side-by-side arrangement section I.

C:

Other coefficient.

Note that integral is performed throughout a whole plane including the connection plane.

The above formula (3) is integral of products of identical electric field components. Therefore, even modes of TM0 polarized waves of the first core 11*a* and the second core 11*b* in the connection plane, which even modes include the Ey components as main components, are converted into a TM0 polarized wave of the third core 11*c*. Meanwhile, even modes of TE0 polarized waves of the first core 11*a* and the second core 11*b* in the connection plane, which even modes include the Ex components as main components, are converted into a TE0 polarized wave of the third core 11*c*.

The conversion therein is performed in the cross-section, and therefore does not substantially lead to an increase in the device length.

As is clear from the above discussion, the substrate-type optical waveguide element 1 has a function of the polarization multiplexing waveguide. Further, unlike the conventional techniques, the substrate-type optical waveguide element 1 does not need two independent devices such as a device for converting a TE0 polarized wave into a TE1 polarized wave and a device for converting a TE1 polarized wave into a TM0 polarized wave. Therefore the substrate-type optical waveguide element 1 enables a smaller device structure.

(Electric Field Distributions in Side-By-Side Arrangement Section)

First, electric field distributions of waveguide modes in respective cross-sections were simulated, for the purpose of explaining an operation principal of the substrate-type optical waveguide element 1. Note that the simulations were performed by the finite element method. Electric field distributions were simulated with use of the substrate-type optical waveguide element 1 configured as shown in FIG. 5. Results of the simulations are shown in FIGS. 3 and 4.

Electric fields in respective cross-sections in a case where a TE0 polarized wave was inputted to the first input port of the first core 11*a* were calculated along the z-axis. Results of the calculation are shown in FIG. 3. A wavelength was 1580 nm. FIG. 3 shows both of Ex and Ey in the electric fields. (*a*) of FIG. 3 shows an electric field of a TE0 polarized wave to be inputted, which was observed in the absence of the second core 11*b*. (*b*) through (*e*) of FIG. 3 indicate a waveguide mode (corresponding to #1 in FIG. 6) having a second highest effective refractive index in the first core 11*a* and the second core 11*b*, and (*f*) of FIG. 3 indicates a TM0 polarized wave of the third core 11*c* at z=1.

Figure 3:
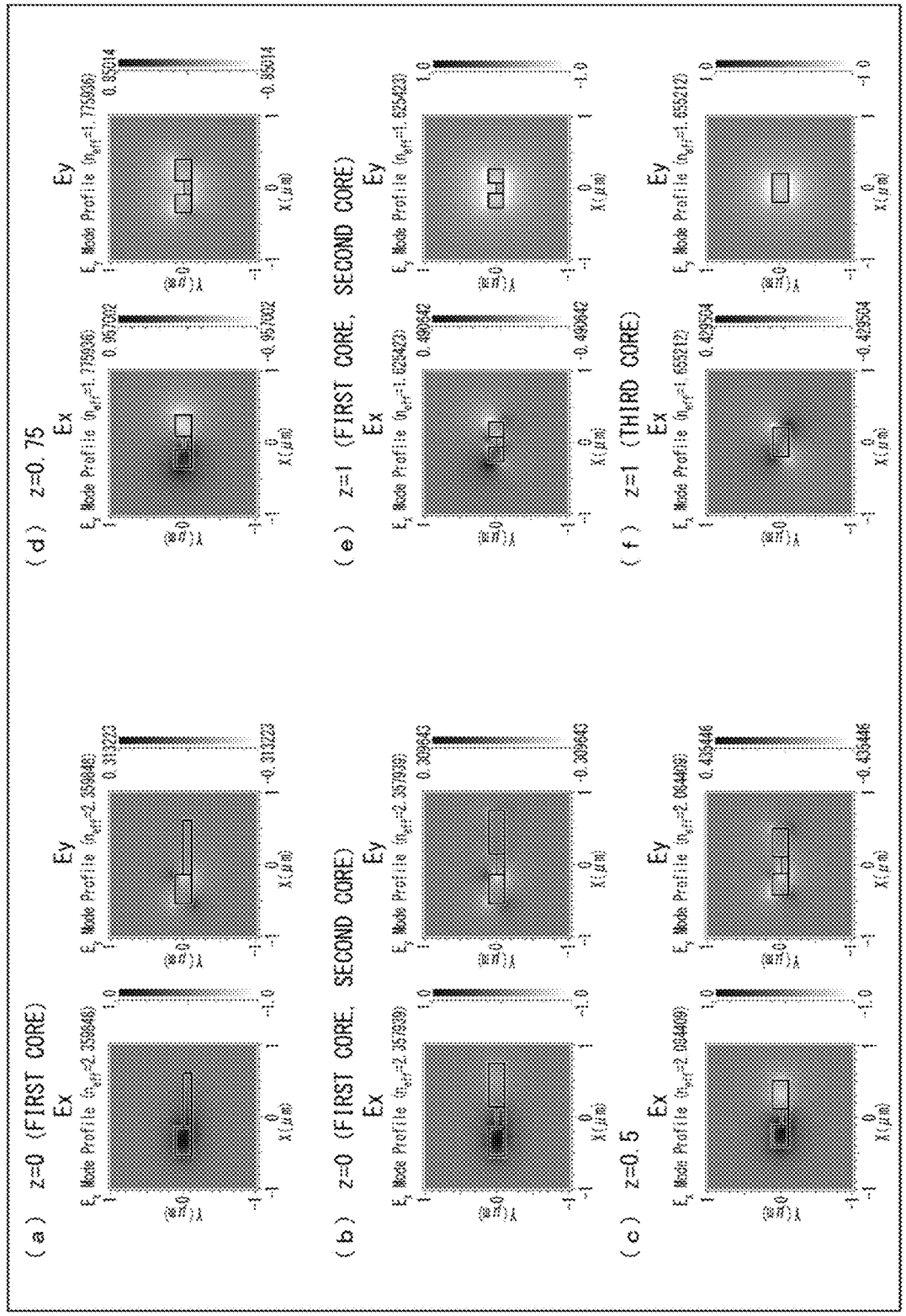
Figure 4:
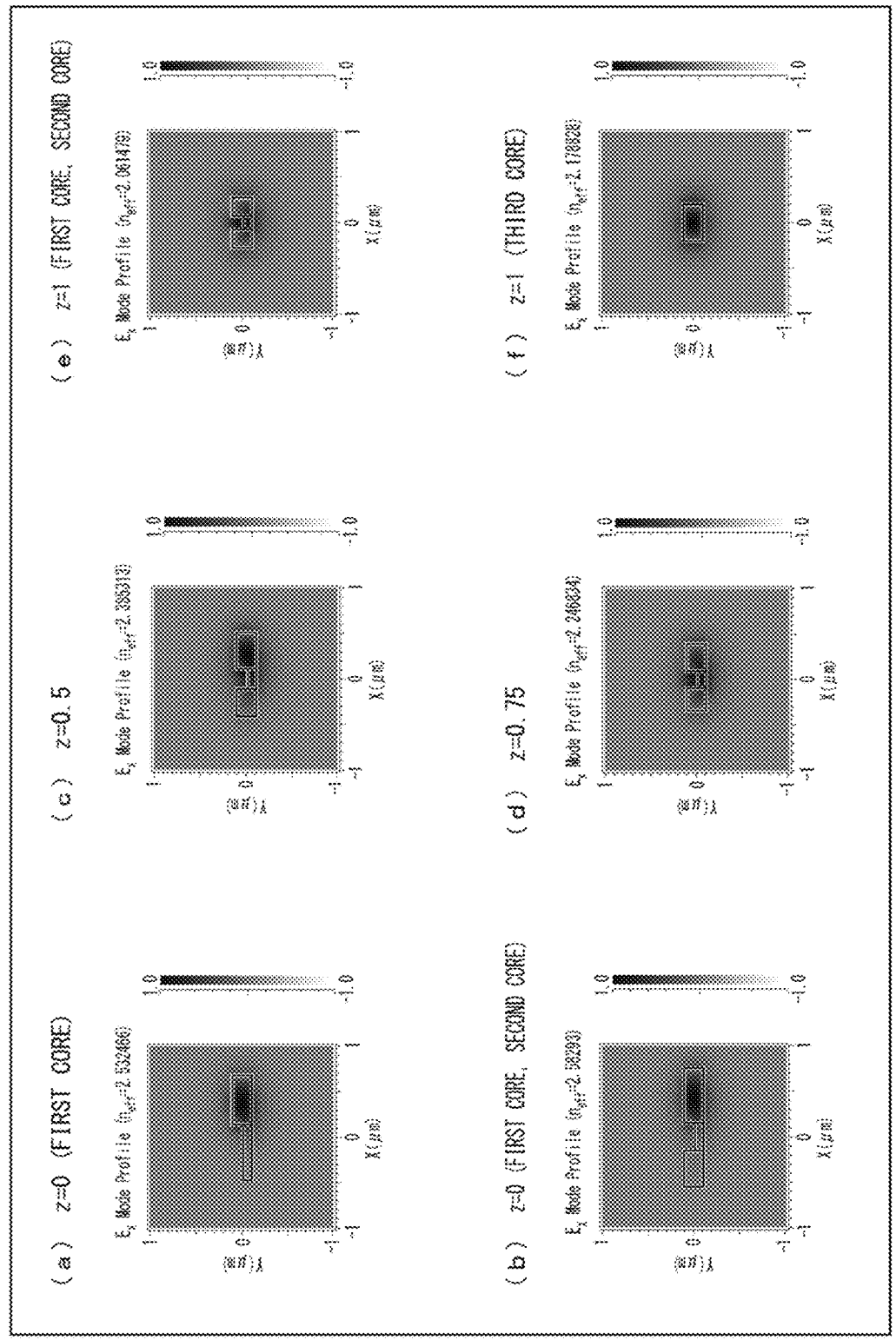

(*b*) of FIG. 3 shows that an electric field of the odd mode of the TE0 polarized wave had a distribution similar to that of the electric filed shown in (*a*) of FIG. 3, which shows the TE0 polarized wave to be inputted. This is because that, by satisfying the requirement (1), the odd mode of the TE0 polarized wave has the electric field distribution localized in the first core 11*a*. In a process transitioned from (*b*) to (*c*) of FIG. 3, the widths of the adjacent waveguides became approximate to each other, so that phase matching occurred. Consequently, the odd mode of the TE0 polarized wave had a distribution extending over the first core 11*a* and the second core 11*b*. (*d*) of FIG. 3 shows an electric field distribution in the interaction section i shown in FIG. 6. This electric field distribution corresponds to a process in which the electric field component Ey in the odd mode of the TE0 polarized wave was strengthened and converted into the even mode of the TM0 polarized wave. It is shown that, through the interaction section i, the odd mode of the TE0 polarized wave was converted into an even mode of a TM0 polarized wave in (*e*) of FIG. 3. (*f*) of FIG. 3 indicates a TM0 polarized wave of the third core 11*c* at z=1. (*f*) of FIG. 3 shows the TM0 polarized wave of the third core 11*c*. It is shown that the TM0 polarized wave of the third core 11*c* had an electric field distribution similar to that of the even mode of the TM0 polarized wave in (*e*) of FIG. 3. Thus, the abutting and bonding enables a highly efficient conversion.

Next, electric fields in respective cross-sections in a case where a TE0 polarized wave was inputted to the second input port of the second core 11*b* were calculated along the z-axis. Results of the calculation are shown in FIG. 4. A wavelength was 1580 nm, and FIG. 4 shows only Ex in the electric fields. (*a*) of FIG. 4 shows an electric field of a TE0 polarized wave to be inputted, which was observed in the absence of the first core 11*a*. (*b*) through (*e*) of Fig. 4 indicate a waveguide mode (corresponding to #0 in FIG. 6) having a highest effective refractive index in the first core 11*a* and the second core 11*b*, and (*f*) of FIG. 4 indicates a TE0 polarized wave of the third core 11*c* at z=1.

(*b*) of FIG. 4 shows that the electric field of the even mode of the TE0 polarized wave had a distribution similar to that of the electric filed shown in (*a*) of FIG. 4, which shows the TE0 polarized wave to be inputted. This is because that, by satisfying the requirement (1), the even mode of the TE0 polarized wave has the electric field, distribution localized in the second core 11*b*. In a process transitioned from (*b*) to (*c*) of FIG. 4, the widths of the adjacent waveguides became approximate to each other, so that phase matching occurred. Consequently, the even mode of the TE0 polarized wave had a distribution extending over the first core 11*a* and the second core 11*b*. (*d*) of FIG. 4 shows an electric field distribution in the interaction section i shown in FIG. 6. The even mode of the TE0 polarized wave does not interact with any mode. Therefore, mode conversion of the even mode of the TE0 polarized wave did not take place. Until (*e*) of FIG. 4, the even mode of the TE0 polarized wave was guided while maintaining its mode as the even mode of the TE0 polarized wave. (*f*) of FIG. 4 shows a TE0 polarized wave of the third core 11*c* at z=1. It is shown that this TE0 polarized wave of the third core 11*c* had an electric field distribution similar to the even mode of the TE0 polarized wave shown in (*e*) of FIG. 4. Thus, the abutting and bonding enables a highly efficient conversion.

As is clear from the above discussion, the substrate-type optical waveguide element 1 serves as the polarization multiplexing waveguide.

In order to manufacture the substrate-type optical waveguide element 1 from a SOI wafer as described above, the heights of the first core 11a, the second core 11b, and the third core 11c are preferably set to be identical to a height of a silicon layer of the SOI wafer, since the core 11 can be manufactured from the silicon layer. This simplifies the etching process in the manufacturing process of the substrate-type optical waveguide element 1.

(First Variation)

With reference to the drawings, the following describes a first variation of the substrate-type optical waveguide element 1 of the first embodiment.

Figure 10:
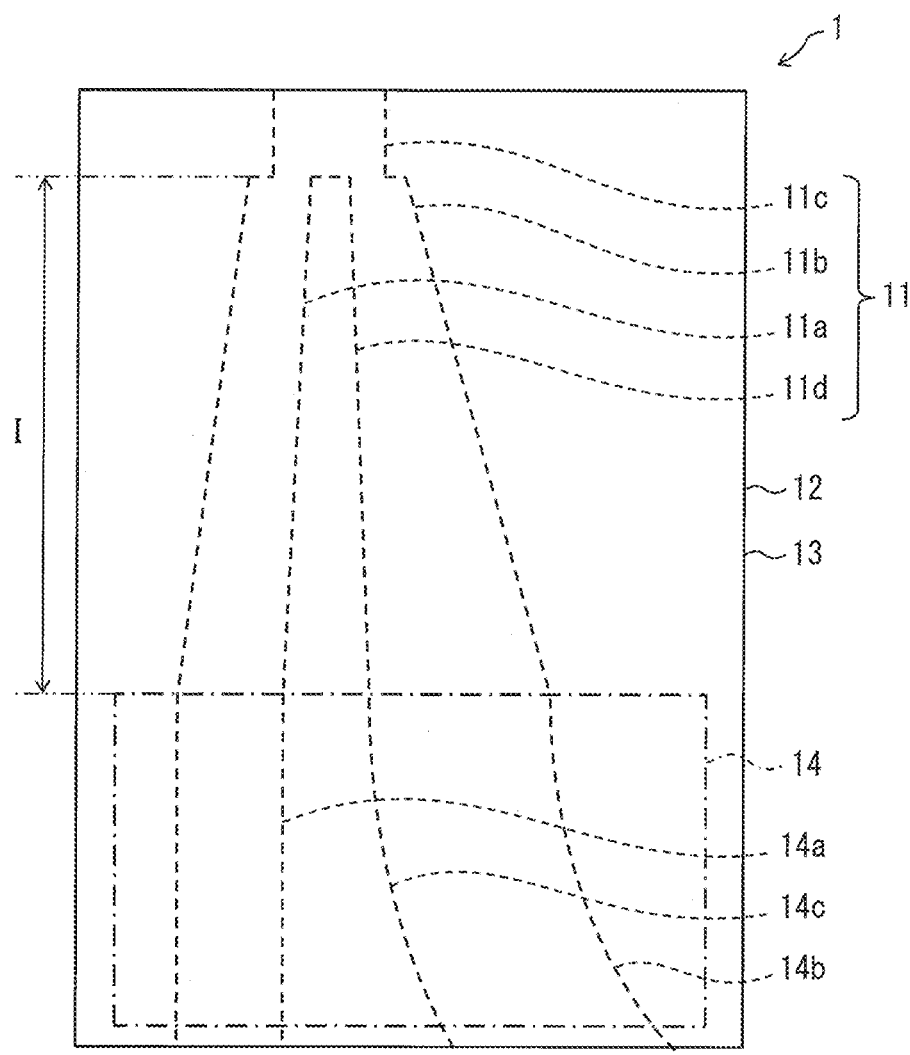
FIG. 10 is a top view of a substrate-type optical waveguide element according to a first variation of the present invention.

With reference to FIG. 10, the following describes a configuration of a substrate-type optical waveguide element 1 according to the present variation. FIG. 10 is a top view of the substrate-type optical waveguide element 1 according to the present variation.

As shown in FIG. 10, the substrate-type optical waveguide element 1 includes a separator section 14 provided so as to precede a side-by-side arrangement section I. The separator section 14 is a core including a fourth core 14a and a fifth core 14b disposed so as to be apart from each other. The fourth core 14a has an emission edge surface connected to an entrance edge surface of first core 11a, and the fifth core 14b has an emission edge surface connected to an entrance edge surface of a second core 11b. A distance between the fourth core 14a and the fifth core 14b increases as the distance is located further from a starting point of the side-by-side arrangement section I.

A width of the fourth core 14a is identical to a width of the first core 11a, and a width of the fifth core 14b is identical to a width of the second core 11b. Therefore, the width of the fourth core 14a is smaller than the width of the fifth core 14b.

In order to gradually increase the distance between the fourth core 14a and the fifth core 14b, the substrate-type optical waveguide element 1 is configured such that the fourth core 14a is extended along a direction parallel to a traveling direction of light in the side-by-side arrangement section I and the fifth core 14b is gently curved.

With the above configuration, it is possible to achieve an adequately long distance between a first entrance port and a second entrance port of the substrate-type optical waveguide element 1.

The present variation is configured such that only the fifth core 14b is curved for the purpose of gradually increasing the distance between the fourth core 14a and the fifth core 14b. However, the present invention is not limited to such a configuration. Alternatively, only the fourth core 14a may be curved. Further alternatively, both of the fourth core 14a and the fifth core 14b may be curved.

As compared with the configuration in which the fourth core 14a is curved, the configuration in which the fifth core 14b is curved can reduce bending loss occurring in the core. As the area of the core increases, i.e., as the width of the core increases, light can be confined in the core more strongly, as long as the height is constant. This leads to a reduction in the bending loss.

Further, in a case where the core 11 includes a slab 11d, the separator section 14 preferably further includes a slab 14c. The slab 14c is a slab which is interposed between the fourth core 14a and fifth core 14b, via which the fourth core 14a and the fifth core 14b are communicated with each other, and which has a height identical to a height of the slab 11d via which the first core 11a and the second core 11b are communicated with each other.

In the configuration in which the separator section 14 includes the slab 14c, a cross-sectional shape of the separator section 14 and a cross-sectional shape of the core 11 coincide with each other in the starting point of the side-by-side arrangement section I.

(Second Variation)

With reference to the drawings, the following describes a second variation of the substrate-type optical waveguide element 1 of the first embodiment.

Figure 11:
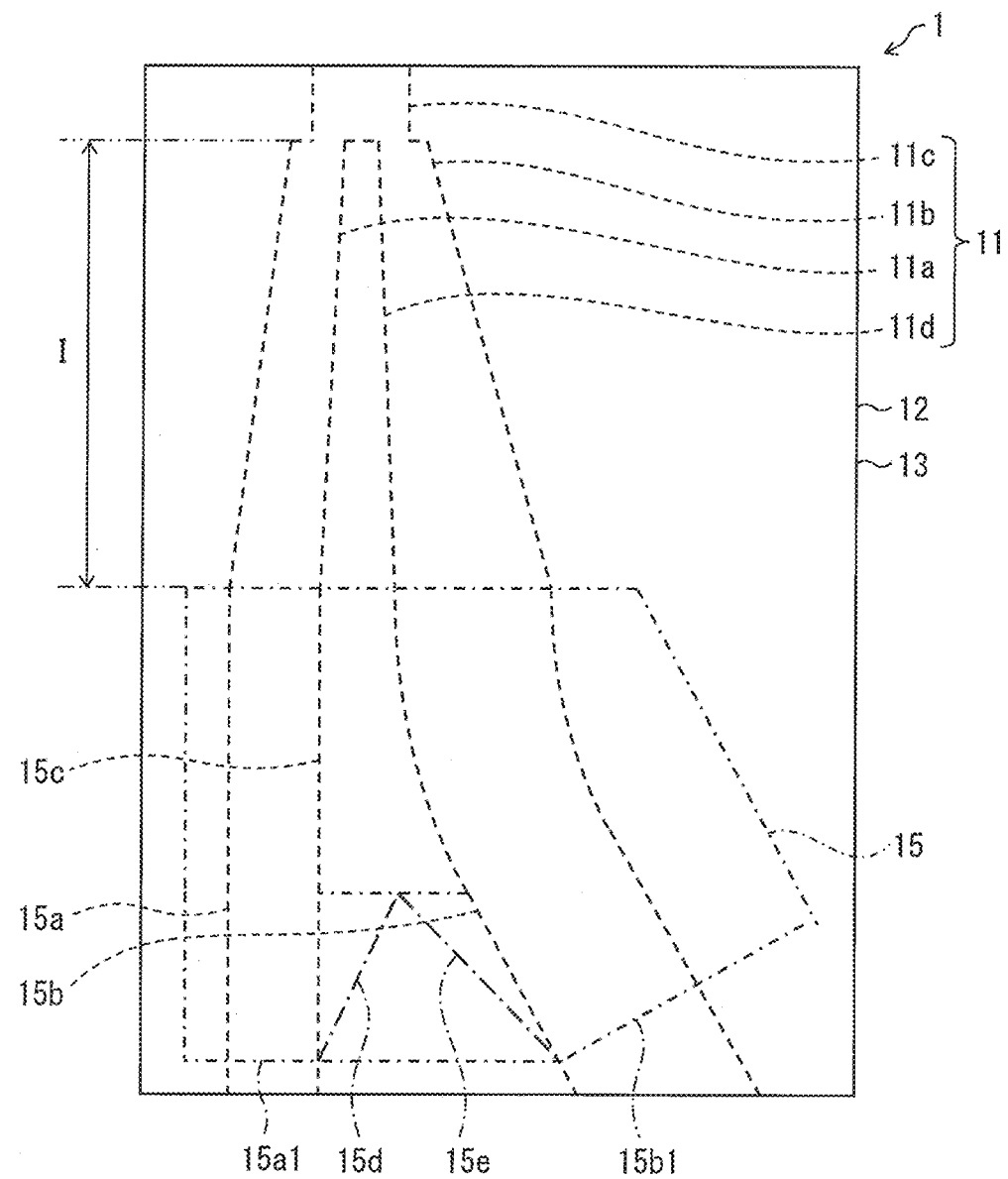
FIG. 11 is a top view of a substrate-type optical waveguide element according to a second variation of the present invention.

With reference to FIG. 11, the following describes a configuration of a substrate-type optical waveguide element 1 according to the present variation. FIG. 11 is a top view of the substrate-type optical waveguide element 1 according to the present variation.

As shown in FIG. 11, the substrate-type optical waveguide element 1 includes a converting part 15 provided so as to precede the side-by-side arrangement section I. The converting part 15 is a core including a fourth core 15a and a fifth core 15b disposed so as to be apart from each other and a slab 15c. The slab 15c corresponds to the slab 14c of the first variation.

The fourth core 15a has an emission edge surface connected to an entrance edge surface of a first core 11a, and the fifth core 15b has an emission edge surface connected to an entrance edge surface of a second core 11b. A distance between the fifth core 15b and the fifth core 15b increases as the distance is located further from a starting point of a side-by-side arrangement section I.

The converting part 15 further includes a first tapered part 15d and a second tapered part 15e.

The first tapered part 15d is a tapered part which has a height identical to a height of a slab 11d, which communicates with the slab 14c and the fourth core 15a, and which has a width increasing as the width is located further from an entrance edge surface 15a1 of the fourth core 15a.

The second tapered part 15e is a tapered part which has a height identical to the height of the slab 11d, which communications with the slab 14c and the fifth core 15b, and which has a width increasing as the width is located further from an entrance edge surface 15b1 of the fifth core 15b.

As shown in FIG. 11, the fifth core 15b has a curve line-like section and a straight line-like section. By including the curve line-like section, the converting part 15 brings about effects similar to those of the separator section 14.

A first entrance port and a second entrance port of the substrate-type optical waveguide element 1 are respectively supplied with TE0 polarized waves from cores of external waveguides. Since the first entrance port and the second entrance port are adequately apart from each other, interaction is quite weak between (i) an odd mode of a TE0 polarized wave resulting from conversion from the TE0 polarized wave taken place in the first entrance port and (ii) an even mode of a TE0 polarized resulting from conversion from the TE0 polarized wave taken place in the second entrance port.

Each of the first tapered part 15d and the second tapered part 15e configured as above brings about an effect of gradually strengthening the interaction between the odd mode of the TE0 polarized wave and the even mode of the TE0 polarized wave as light guided through the converting part 15 gets closer to the starting point of the side-by-side arrangement section I from the first entrance port and the second entrance port.

(Numerical Simulation)

Next, for the present example, loss and a polarization extinction ratio were calculated by simulation. The loss and the polarization extinction ratio are defined as below.

$$TM\ LOSS = -10 \times \log_{10}\left(\frac{TM_0\ \text{power outputted from output port}}{TE_0\ \text{power inputted to input port 1}}\right) \quad (4)$$

$$TE\ LOSS = -10 \times \log_{10}\left(\frac{TE_0\ \text{power outputted from output port}}{TE_0\ \text{power inputted to input port 2}}\right) \quad (5)$$

POLARIZATION EXTINCTION RATIO = (6)

$$10 \times \log_{10}\left(\frac{TM_0\ \text{power outputted from output port}}{TE_0\ \text{power outputted from output port}}\right)$$

Note that the polarization extinction ratio was calculated assuming a case where a TE0 polarized wave was inputted to the first input port. This is because the fist core $11a$ involves polarized wave conversion from an odd mode of a TE0 polarized wave into an even mode of a TE0 polarized wave and therefore has a great effect on the crosstalk.

The simulations were performed by the finite-difference time-domain method (FDTD). Further, the simulations were performed for a configuration (see FIG. 12) obtained by applying the configuration (the configuration including the curved waveguide) of the first variation described in the first embodiment to the configuration of the example shown in FIG. 5.

Figure 13:
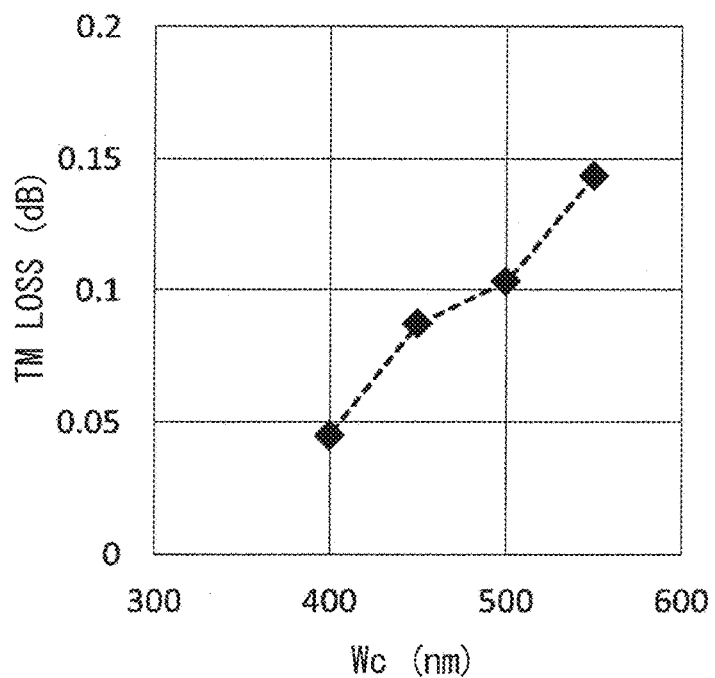
FIG. 13 is a graph showing a result of numerical calculation of a width $W_c$ dependency of a TM loss of the substrate-type optical waveguide element shown in FIG. 12, in a case where a wavelength of light was 1580 nm and the substrate-type optical waveguide element was configured to have a device length of 60 µm.

First, in order to study an effect of loss due to the width $W_c$ of the third core $11c$, a TM loss occurred when the width $W_c$ was varied was calculated. A wavelength of light was 1580 nm, and a length of the side-by-side arrangement section I was set to 60 μm. Note that the length of the side-by-side arrangement section I is herein also referred to as a device length. The result of the TM loss is shown in FIG. 13. FIG. 13 shows that, as the width of the third core $11c$ becomes smaller, the TM loss can be reduced more. This is because that, as described above, the proportion of the overlapping of (i) the electric field distribution of the even mode of the TM0 polarized wave of the core 11 including the cores $11a$ and $11b$ and (ii) the electric field distribution of the TM0 polarized wave of the third core $11c$ is increased in the connection plane.

Next, wavelength dependencies of the TM loss, the TE loss, and the polarization extinction ratio were calculated. A device length was set to 80 μm, and $W_c$=400 nm. The results are shown in FIGS. 14 and 15.

(a) of FIG. 14 shows that the TM loss was 0.22 dB or less (a conversion efficiency of 95% or more) in a quite wide wavelength range of 120 nm including the C-band (wavelength range: 1530 nm to 1565 nm) and the L-band (wavelength range: 1565 nm to 1625 nm), which are generally used for the optical communication. Thus, the substrate-type optical waveguide element 1 is capable of converting a TE0 polarized wave into a TM0 polarized wave with quite small loss. Further, a fluctuation in the TM loss (a ratio between a maximum value and a minimum value of the loss in the above wavelength range) was 0.15 dB or less, which is quite small.

(a) of FIG. 14 shows that the TE loss was 0.29 dB or less in the above wavelength range. Namely, the substrate-type optical wave guide element 1 is also able to emit the TE0 polarized wave via the output port almost without loss. A fluctuation in the TE loss was 0.06 dB or less, which is quite small.

It is shown that the polarization extinction ratio was 32 dB or more in the above wavelength range. This means that, in a case where a TE0 polarized wave is inputted to the first input port, a ratio of a power outputted as the TE0 polarized wave due to insufficient conversion with respect to a power of a TM0 polarized wave outputted was 1/1580 or less. This means that the substrate-type optical waveguide element 1 has a high polarization conversion efficiency, and is less affected by the crosstalk.

As is clear from the above, the substrate-type optical waveguide element 1 is capable of reducing the TE loss and the TM loss in a wide wavelength range. The reasons for this are considered to he as follows.

A part in which the first core $11a$ and the second core $11b$ are adjacent to each other, i.e., the side-by side arrangement section I adiabatically converts a waveguide mode of light inputted to the first entrance port into another waveguide mode. The adiabatic conversion gradually changes an electric field distribution along the traveling direction of light, and therefore has a conversion efficiency with a low wavelength independency.

Therefore, according to the substrate-type optical waveguide element 1, it is possible to reduce, in the ending point of the side-by-side arrangement section I, the wavelength independency of the mode conversion efficiency between the waveguide mode of the side-by-side arrangement section I and the waveguide mode of the third core $11c$. For example, the longer the wavelength of light guided through the core becomes, the weaker the confinement of light in the core becomes. Consequently, the electric field distribution expands into the cladding. Similarly, the shorter the wavelength of light guided through the core becomes, the stronger the electric field is confined in the core. Consequently, the electric field distribution is confined in the core.

However, a change in the electric field distribution due to a change in the wavelength occurs both in the waveguide mode of the side-by-side arrangement section I and the waveguide mode of the third core $11c$ in a similar way. For example, as the wavelength of guided light becomes longer, the waveguide modes of light guided through the first core $11a$ and the second core $11b$ expand. However, since the waveguide mode of light guided through the third core $11c$ also expands, a proportion of overlapping of the electric fields is not changed greatly relative to the change in the wavelength of the light. Further, according to the formula (3), a conversion efficiency in the mode conversion is determined depending on the overlapping of the electric field distributions. Thus, the substrate-type optical waveguide element 1 is a substrate-type optical waveguide having a low dependency on a wavelength of guided light.

Next, in order to study an effect of a manufacturing deviation, a TM loss occurred when the widths of the cores of all the waveguides were each varied by +30 nm from the values shown in FIG. 12 and a TM loss occurred when the widths of the cores of all the waveguides were each varied by −30 nm from the values shown in FIG. 12 were calculated. A device length was set to 80 μm, and $W_c$=400 nm. The results are shown in FIG. 16. In FIG. 16, the expression "w/o deviation" indicates a configuration in which no manufacturing deviation existed, the expression "width+30 nm" indicates a configuration in which the widths of the cores were varied by +30 nm, and the expression "width −30 nm" indicates a configuration in which the widths of the cores were varied by −30 nm.

FIG. 16 shows that, in a wide wavelength range of 120 nm, the TM loss was 0.23 dB or less even in consideration of the effect of the manufacturing deviation, namely, the TM loss was maintained at a quite low level. Further, a fluctuation in the TM loss under this manufacturing deviation was 0.17 dB, which is quite small. (This fluctuation also includes a fluctuation in the loss within the wavelength range.)

Thus, it is shown that the substrate-type optical waveguide element 1 is strong against the manufacturing deviation.

Lastly, the example (FIG. 12) was actually manufactured, and a TM loss and a TE loss were measured therein. The results are shown in FIG. 17. According to FIG. 17, in the wavelength range identical to those of FIGS. 14 and 15, the TM loss was 0.35 dB or less and the TE loss was 0.55 dB or less, even including noises of a measurement system. This demonstrates that the example was operable with small loss.

Thus, according to the substrate-type optical waveguide element 1, it is possible to reduce the effect given on the TE loss and the TM loss by the manufacturing deviation occurring in the manufacturing process. In other words, the TE loss and the TM loss of the substrate-type optical waveguide element 1 are less affected by the manufacturing deviation. The reasons for this are considered as below.

In a case where the substrate-type optical waveguide element 1 is manufactured by use of the lithography process and the etching process, manufacturing deviations that may occur due to the respective processes occur in the whole substrate-type optical waveguide element 1 evenly, particularly, in the whole core 11 evenly. Further, also in a case where the cores 11a through 11c and the slab 11d are manufactured by performing the etching twice, the cores 11a through 11c are manufactured at once by an identical process. Therefore, even if a manufacturing deviation occurs, the cores 11a through 11c are formed to have an identical height, and therefore the heights of the cores 11a through 11c have an identical relative relationship with the height of the slab 11d.

Further, as well as in the case where the wavelength is varied, a fluctuation in the loss is small in the portion where the adiabatic conversion takes place, because an electric field is changed gradually therein. Further, also the abutted and bonded portion, an effect of the manufacturing deviation is small, because electric field distributions change in all the waveguides in a similar manner (so as to expand or to be narrowed).

[Second Embodiment]

With reference to the drawings, the following describes a substrate-type optical waveguide element according to a second embodiment of the present invention.

(Configuration of Substrate-Type Optical Waveguide Element)

With reference to FIG. 18, a configuration of a substrate-type optical waveguide element 2 according to the present embodiment will be described. (a) of FIG. 18 is a top view of the substrate-type optical waveguide element 2. (b) and (c) of FIG. 18 are cross-sectional views of the substrate-type optical waveguide element 2. (b) of FIG. 18 is an AA' cross-sectional view taken along line A-A' shown in (a) of FIG. 18, and (c) of FIG. 18 is a BB' cross-sectional view taken along line B-B' shown in (a) of FIG. 18.

As well as the substrate-type optical waveguide element 1 of the first embodiment, the substrate-type optical waveguide element 2 includes a core 21, a lower cladding 22, and an upper cladding 23. The core 21 is made of silicon, and the lower cladding 22 and the upper cladding 23 are made of silica.

The core 21 is a core on the lower cladding 22, the core including a first core 21a, a second core 21b, and a third core 21c. As shown in (a) of FIG. 18, the first core 21a, the second core 21b, and the third core 21c are arranged in a similar manner to that of the first core 11a, the second core 11b, and the third core 11c in the substrate-type optical waveguide element 1.

As shown in (b) and (c) of FIG. 18, unlike the substrate-type optical waveguide element 1, the substrate-type optical waveguide element 2 includes the first core 21a, the second core 21b, and the third core 21c each having a cross-sectional shape of a vertically asymmetric trapezoid, rather than a rectangle, in order to satisfy the requirement (4) described in the first embodiment. Accordingly, the substrate-type optical waveguide element 2 can satisfy the requirement (4) even without a slab (plate-shaped core) between the first core 21a and the second core 21b.

Preferably, (i) the first core 21a, the second core 21b, and the third core 21c each have a cross-sectional shape of an isosceles trapezoid and (ii) the first core 21a and the second core 21b have cross-sectional shapes that are congruent with each other in the ending point. ($z=1$) of the side-by-side arrangement section I.

According to this configuration, a cross-section of the core 21 which cross-section is located in the ending point of the side-by-side arrangement section I has a horizontally-symmetric shape, and the entrance edge surface of the third core 21c has a horizontally-symmetric shape. Further, a horizontal symmetry axis of the cross-section of the core 21 which cross-section is located in the ending point of the side-by-side arrangement section I and a horizontal symmetric axis of the entrance edge surface of the third core 21c coincide with each other.

In order to achieve such a configuration, the elements of the substrate-type optical waveguide element 2 are configured as below (see (a) through (c) of FIG. 18).

The first core 21a, the second core 21b, and the third core 21c each have a height of 220 nm.

The entrance edge surface (first entrance port) of the first core 21a has a width of 400 nm, and the emission edge surface of the first core 21a has a width of 200 nm.

The entrance edge surface (second entrance port) of the second core 21b has a width of 600 nm, and the emission edge surface of the second core 21b has a width of 200 nm.

A distance between the first core 21a and the second core 21b is 300 nm in the starting point of the side-by-side arrangement section I. A distance between the first core 21a and the second core 21b is 150 in the ending point of the side-by-side arrangement section I.

The third core 21c has a width of 400 nm.

In the present embodiment, angles made by lateral surfaces of cores 21a to 21c in the core 21 and a line perpendicular to a surface of the lower cladding 22 are each 20°. By selecting a suitable etching condition for forming the core 21, it is possible to form the core 21 having inclined lateral surfaces. In this case, it is possible to form the core 21 by performing etching once. This simplifies a manufacturing process of the substrate-type optical waveguide element 2.

Herein, as shown in (a) of FIG. 18, a largest width among widths of each of the cores 21a to 21c is defined as the "width" of a respective one of the cores 21a to 21c, Concretely, a width of a bottom side of each of the cores 21a to 21c is regarded as the "width" of a respective one of the cores 21a to 21c.

As well as in the first embodiment, the trapezoid encompasses a quasi-trapezoid, and the isosceles trapezoid encompasses a quasi-isosceles trapezoid.

In the present embodiment, the configuration in which the first core 21a and the second core 21b have a cross-sectional shape of an isosceles trapezoid throughout the side-by-side arrangement section I has been explained. However, the present invention is not limited to such a configuration. Namely, in order to satisfy the requirement (4), it is only necessary that at least parts of the first core 21a and the second core 21b have a cross-sectional shape of an isosceles trapezoid, the parts being in an interaction section i, in which an odd mode of a TE0 polarized wave and an even mode of a TM0 polarized wave guided through the side-by-side arrangement section T interact with each other.

Further, in order to satisfy the requirement (4), instead of the first core 21a and the second core 21b having a cross-sectional shape of an isosceles trapezoid, a slab (plate-shaped core) may alternatively be employed that is projected from a lateral side of at least one of the first core and the second core in a direction being parallel to a surface of the lower cladding 22 and being orthogonal to a z-axis direction.

(a) of FIG. 19 is a graph showing a result of numerical calculation of effective refractive indexes of an even mode of a TE0 polarized wave, an odd mode of a TE0 polarized wave, and an even mode of TM0 guided through the core of the substrate-type optical waveguide element 2, the numerical calculation having been performed along a traveling direction of light. (b) of FIG. 19 is a graph providing an enlarged view of the interaction section i and its vicinity shown in the graph of (a) of FIG. 19. FIG. 19 shows that causing the odd mode of the TE0 polarized wave to be guided through the interaction section i enables adiabatic mode conversion from the odd mode of the TE0 polarized wave into an even mode of a TM0 polarized wave.

[Third Embodiment]

With reference to the drawings, the following describes a substrate-type optical waveguide element according to a third embodiment of the present invention.

(Configuration of Substrate-Type Optical Waveguide Element)

With reference to FIG. 20, a configuration of a substrate-type optical waveguide element 3 according to the present embodiment will be described. (a) of FIG. 20 is a top view of the substrate-type optical waveguide element 3. (b) and (c) of FIG. 20 are cross-sectional views of the substrate-type optical waveguide element 3. (b) of FIG. 20 is an AA' cross-sectional view taken along line A-A' shown in (a) of FIG. 20, and (c) of FIG. 20 is a BB' cross-sectional view taken along line B-B' shown in (a) of FIG. 20.

As well as the substrate-type optical waveguide element 1 of the first embodiment, the substrate-type optical waveguide element 3 includes a core 31 and a lower cladding 32. The core 31 is made of silicon, and the lower cladding 32 is made of silica. In other words, an upper cladding is omitted in the substrate-type optical waveguide element 3. Omitting the upper cladding results in formation of, on the lower cladding 32, an air layer ("Air" shown in (b) and (c) of FIG. 20) that surrounds the core 31. The air has a refractive index being lower than a refractive index of silica, which is the material of the core 31, and being different from a refractive index of silicon, which is the material of the lower cladding 32. Thus, in the substrate-type optical waveguide element 3, the lower cladding 32 and the upper cladding are made of the materials having different refractive indexes.

The core 31 is a core on the lower cladding 32, the core including a first core 31a, a second core 31b, and a third core 31c. As shown in (a) of FIG. 20, the first core 31a, the second core 31b, and the third core 31c are arranged in a similar manner to that of the first core 11a, the second core 11b, and the third core 11c in the substrate-type optical waveguide element 1.

As shown in (b) and (c) of FIG. 20, by omitting the upper cladding, the substrate-type optical waveguide element 3 satisfies the requirement (4) described in the first embodiment. Therefore, even without a slab (plate-shaped core) between the first core 21a and the second core 21b, the substrate-type optical waveguide element 3 can satisfy the requirement (4).

According to this configuration, a cross-section of the core 31 which cross-section is located in the ending point of the side-by-side arrangement section I has a horizontally symmetric shape, and the entrance edge surface of the third core 31c has a horizontally symmetric shape. Further, a horizontal symmetric axis of the cross-section of the core 31 which cross-section is located in the ending point of the side-by-side arrangement section I and a horizontal symmetric axis of the entrance edge surface of the third core 31c coincide with each other.

In order to achieve such a configuration, the elements of the substrate-type optical waveguide element 3 are configured as below (see (a) through (c) of FIG. 20).

The entrance edge surface (first entrance port) of the first core 31a has a width of 400 nm, and the emission edge surface of the first core 31a has a width of 200 nm. The first core 31a has a height of 220 nm.

The entrance edge surface (second entrance port) of the second core 31b has a width of 600 nm, and the emission edge surface of the second core 31b has a width of 200 nm. The second core 31b has a height of 220 nm, which is identical to the height of the first core 21a.

A distance between the first core 31a and the second core 31b is 300 nm in the starting point of the side-by-side arrangement section, and is 150 nm in the ending point of the side-by-side arrangement section.

The third core 31c has a width of 400 nm.

In the present embodiment, the configuration in which the air layer surrounding the core 31 is used as the upper cladding has been explained. However, the present invention is not limited to such a configuration. Namely, in order to satisfy the requirement (4), a material of the upper cladding only needs to have a refractive index being lower than a refractive index of the core 31 and being different from a refractive index of the lower cladding 32.

In a case where an upper cladding is to be formed by laminating, on the lower cladding 32, a material satisfying this condition in such a manner that the core 31 is buried in the upper cladding, the upper cladding only needs to be provided at least in an interaction section i of the side-by-side arrangement section I, the interaction section i allowing an odd mode of a TE0 polarized wave and an even mode of a TM0 polarized wave guided through the side-by-side arrangement section I to interact with each other. Alternatively, the upper cladding may be formed over the whole side-by-side arrangement section I.

FIG. 21 is a graph showing a result of numerical calculation of effective refractive indexes of an even mode of a TE0 polarized wave, an odd mode of a TE0 polarized wave, and an even mode of TM0 guided through the core of the substrate-type optical waveguide element 3, the numerical calculation having been performed along a traveling direction of light. FIG. 21 shows that causing the odd mode of the TE0 polarized wave to be guided through the interaction section i enables adiabatic mode conversion from the odd mode of the TE0 polarized wave into an even mode of a TM0 polarized wave.

[Fourth Embodiment]

With reference to the drawings, the following describes a fourth embodiment of a substrate-type optical waveguide element according to the present invention.

(Configuration of Substrate-Type Optical Waveguide Element)

With reference to FIG. 22, a configuration of a substrate-type optical waveguide element 6 according to the present embodiment will be described. (a) of FIG. 22 is a top view of the substrate-type optical waveguide element 6. (b) and (e) of FIG. 22 are cross-sectional views of the substrate-type optical waveguide element 6. (b) of FIG. 22 is an AA' cross-sectional view taken along line A-A' shown in (a) of FIG. 22, and (c) of FIG. 22 is a BB' cross-sectional view taken along line B-B' shown in (a) of FIG. 22.

As shown in (a) of FIG. 22, the substrate-type optical waveguide element 6 includes a lower cladding 62, a core 61 on the lower cladding 62, and an upper cladding on the lower cladding 62, the upper cladding covering the core 61.

The core 61 includes a first core 61a and a second core 61b arranged side by side, and a third core 61c having an entrance edge surface 61c1 connected to an emission edge surface 61a2 of the first core 61a and an emission edge surface 61b2 of the second core 61b. The core 61 includes a slab 61d. The slab 61d is a slab via which the first core 61a and the second core 61b are communicated with each other and which has a lower height than heights of the first core 61a and the second core 61b.

The above-described configuration of the substrate type optical waveguide element 6 is similar to that of the substrate-type optical waveguide element 1 according to the first embodiment.

On the other hand, the substrate-type optical waveguide element 6 is different from the substrate-type optical waveguide element 1 in the following two configurations.

(1) The emission edge surface 61a2 of the first core 61a and the emission edge surface 61b2 of the second core 61b are directly in contact with each other.

(2) A width of the third core 61c is equal to a sum of a width of the first core 61a and a width of the second core 61b.

The substrate-type optical waveguide element 6 configured as above brings about not only effects similar to those of the substrate-type optical waveguide element 1 but also an effect of enhancing a conversion efficiency in mode conversion of a waveguide mode of an entrance side of an ending point of a side-by-side arrangement section I into a waveguide mode of an emission side of the ending point of the side-by-side arrangement section I. The reason for this is as follows. That is, a cross-section of the core 61 which cross-section is located in the entrance side of the ending point of the side-by-side arrangement section I and a cross-section of the core 61 which cross-section is located in the emission side of the ending point of the side -by-side arrangement section I are congruent with each other, it is possible to reduce the loss occurring in the mode conversion.

[Application Example]

With reference to the drawings, the following describes an application example of the substrate-type optical waveguide element according to each embodiment of the present invention.

With reference to FIG. 23, a configuration of an optical modulator according to the present application example will be described. FIG. 23 is a block diagram illustrating a configuration of an optical modulator 4 of the present application example.

Each of the substrate-type optical waveguide elements 1 through 3 and 6 according to the above described embodiments is usable as a polarization multiplexing waveguide to be included in the optical modulator (a substrate-type optical waveguide element described in the claims) according to the application example of the present invention.

The optical modulator 4 according to the application example of the present invention includes a first phase modulator 41, a second phase modulator 42, and a polarization multiplexing waveguide 43. A TE0 polarized wave is divided into two, which are then inputted to the first phase modulator 41 and the second phase modulator 42, respectively.

The first phase modulator 41 and the second phase modulator 42 respectively modulate, into modulating signals of a predetermined system, the TE0 polarized waves inputted thereto. Note that the modulating signals to be outputted from the phase modulators 41 and 42 are outputted from the phase modulators 41 and 42 in the form of the TE0 polarized waves. Here, examples of the modulating signal of the predetermined system encompass a QPSK (Quadrature Phase Shift Keying) signal.

The modulating signal of the TE0 polarized wave resulting from modulation by the first phase modulator 41 is inputted to the first entrance port of the polarization multiplexing waveguide 43, and the modulating signal of the TE0 polarized wave resulting from modulation by the second phase modulator 42 is inputted to the second, entrance port of the polarization multiplexing waveguide 43.

The polarization multiplexing waveguide 43 serves as a polarization multiplexing waveguide for converting the TE0 polarized wave inputted to the first entrance port into a TM0 polarized wave and multiplexing the TM0 polarized wave thus converted and the TE0 polarized wave inputted to the second entrance port.

Each of the substrate-type optical waveguide elements 1 through 3 and 6 according to the above -described embodiments is available as a polarization multiplexing waveguide 43 to be included in the optical modulator 4. For example, in a case where the substrate -type optical waveguide element 1 of the first embodiment is used as the polarization multiplexing waveguide 43 of the optical modulator 4, the first core 11a and the second core 11b of the substrate-type optical waveguide element 1 respectively correspond to the first entrance port and the second entrance port of the polarization multiplexing waveguide 43.

Therefore, the entrance edge surface of the first core 11a is supplied with a TE0 polarized wave modulated by the first phase modulator 41, and the entrance edge surface of the second core 11b is supplied with a TE0 polarized wave modulated by the second phase modulator 42.

The optical modulator 4 including the polarization multiplexing waveguide 43 involves small loss in a wide wavelength range including the C-band and the L-band. Thus, an optical modulator including a substrate-type optical waveguide involving small loss in the wide wavelength range can be achieved.

Note that the method in which the phase modulators 41 and 42 modulate the TE0 polarized waves is not limited to the QPSK system. Even with the optical modulator having a complex configuration, use of the present invention enables to perform the polarization multiplexing. Examples of other phase modulation techniques encompass OOK modulation, and QAM modulation.

As another example of the method in which the phase modulators 41 and 42 modulate the TE0 polarized waves, there is a modulation method of providing a p-n junction in a rib waveguide and changing a phase by a voltage applied to a depletion layer therein. In a case where such a modulation method is employed, the phase modulators 41 and 42 and the substrate-type optical waveguide element 1 can be manufactured at once in the process for manufacturing the substrate-type optical waveguide element 1. This is because the rib waveguides in the phase modulators 41 and 42 are made of step-formed cores that are formable by a manufacturing process including etching the core twice, which is also capable of manufacturing the substrate-type optical waveguide element 1. Therefore, no additional manufacturing process for forming the phase modulators 41 and 42 is necessary.

The present invention is not limited to the embodiments, but can be altered by a skilled person in the art within the scope of the claims. An embodiment derived from a proper combination of technical means each disclosed in a different embodiment is also encompassed in the technical scope of the present invention.

[Summary]

As described above, the substrate-type optical waveguide element according to each of the above -described embodiments is a substrate-type optical waveguide element including: a lower cladding; a core on the lower cladding, the core including a first core and a second core arranged side by side and a third core having an entrance edge surface connected to emission edge surfaces of the first core and the second core; and an upper cladding on the lower cladding, the upper cladding covering the core, the first core and the second core being arranged side by side in a side-by-side arrangement section that is started in a starting point corresponding to entrance edge surfaces of the first core and the second core and is ended in an ending point corresponding to the emission edge surfaces of the first core and the second core, an effective refractive index of a TE0 polarized wave guided through the first core in the absence of the second core being lower than an effective refractive index of a TE0 polarized wave guided through the first core in the absence of the second core being lower than an effective refractive index of a TE0 polarized wave guide through the second core in the absence of the first core, each of the effective refractive indexes being observed in the starting point of the side-by -side arrangement section, an effective refractive index of a TM0 polarized wave guided through the first core in the absence of the second core and the effective refractive index of the TE0 polarized wave guided through the core in the absence of the first core being continuous as a function of a distance from the starting point of the side -by-side arrangement section, a magnitude relationship between an effective refractive index of an odd mode of a TE0 polarized wave guided through the core and an effective refractive index of an even mode of a TM0 polarized wave guided through the core being reversed between the starting point and the ending point of the side-by-side arrangement section, a refractive index distribution in a cross-section of the substrate-type optical waveguide element being vertically asymmetrical, the cross-section being perpendicular to a traveling direction of light guided through the core, the cross-section being in an interaction section, in which the odd mode of the TE0 polarized wave guided through the core and the even mode of the TM0 polarized wave guided through the core interact with each other.

TE0 polarized waves are respectively inputted to the first core and the second core of the substrate-type optical waveguide element configured as above. In this case, the TE0 polarized wave that has entered the first core can be regarded as an odd mode of a TE0 polarized wave to be guided through the core (including both of the first core and the second core). The odd mode of the TE0 polarized wave guided through the core is converted into an even mode of a TM0 polarized wave in a process of being guided through the side-by-side arrangement section I, and then enters the third core. The even mode of the TM0 polarized wave that has entered the third core is converted into a TM0 polarized wave to be guided through the third core. The TM0 polarized wave guided through the third core is outputted externally.

Meanwhile, the TE0 polarized wave that has entered the second core can be regarded as an even mode of a TE0 polarized wave to be guided through the core. The even mode of the TE0 polarized wave to be guided through the core is guided through the side-by-side arrangement section I while maintaining its mode as the even mode of the TE0 polarized wave, and then enters the third core. The even mode of the TED polarized wave that has entered the third core is converted into a TE0 polarized wave to be guided through the third core. The TE0 polarized wave guided through the third core is outputted externally.

Thus, the substrate-type optical waveguide element according to each of the above-described embodiments serves as a polarization multiplexing waveguide for converting a TE0 polarized wave that has entered one entrance port into a TM0 polarized wave and for multiplexing the resultant TM0 polarized wave and a TE0 polarized wave that has entered the other entrance port. Namely, the substrate-type optical waveguide element has functions of both of the polarization rotator for converting a TE0 polarized wave into a TM0 polarized wave and the polarization beam combiner for multiplexing a TM0 polarized wave and a TE0 polarized wave. Therefore, as compared with a configuration including the polarization rotator and the polarization beam combiner as individual elements, the polarization multiplexing waveguide having the above configuration has a reduced device length.

Note that, in each of the above-described embodiments, the expression "a refractive index distribution in a cross-section of the substrate-type optical waveguide element being vertically asymmetrical, the cross-section being perpendicular to a traveling direction of light guided through the core" means that the refractive index distribution is not line-symmetrical with respect to any straight line in the cross-section, the straight line being parallel to an interface between the lower cladding and the upper cladding.

Further, the substrate-type optical waveguide element is preferably configured such that the emission edge surface of the first core and the emission edge surface of the second core are apart from each other.

The substrate-type optical waveguide element can be manufactured by use of the lithography process and the etching process in combination. With the above configuration, a distance between the first core and the second core in the ending point of the side-by-side arrangement section can be set to be adequately large relative to a possible minimum distance between the first core and the second core that can be made by the lithography process and the etching process. Therefore, according to the substrate-type optical waveguide element, it is possible to reduce a deviation of a shape of a part of the substrate-type optical waveguide element which part corresponds to the ending point of the side-by-side arrangement section, so as to reduce the loss caused by the deviation in the shape.

Further, the substrate-type optical waveguide element is preferably configured such that the emission edge surface of the first core and the emission edge surface of the second core are congruent with each other, a cross-section of the core which cross-section is located in an entrance side of the ending point of the side-by-side arrangement section has a horizontally symmetric shape, and a cross-section of the core which cross-section is located in an emission side of the ending point of the side-by-side arrangement section has a horizontally symmetric shape, and a symmetric axis of the cross section of the core which cross-section is located in the entrance side of the ending point of the side-by-side arrangement section and a symmetric axis of the cross-section of the core which cross-section is located in the emission side of the ending point of the side-by-side arrangement section coincide with each other.

With the substrate-type optical waveguide element having the above configuration, the loss and the crosstalk can be reduced.

Further, the substrate-type optical waveguide element is preferably configured such that a width $W_{1out}$ of the emission edge surface of the first core, a width $W_{2out}$ of the emission edge surface of the second core, and a width $W_{3in}$ of the entrance edge surface of the third core satisfy $W_{1out} + W_{2out} > W_{3in}$.

With the above configuration, it is possible to further reduce the loss occurring in the ending point of the side-by-side arrangement section.

Further, the substrate-type optical waveguide element preferably configured such that a distance between the first core and the second core is gradually reduced as the distance is located closer to the ending point from the starting point in the side-by-side arrangement section.

With the above configuration, it is possible to provide the side-by-side arrangement section that is capable of mode conversion from the odd mode of the TE0 polarized wave into the even mode of the TM0 polarized wave while keeping an adequate distance between the entrance edge surfaces of the first core and the entrance edge surfaces of the second core in the starting point of the side-by-side arrangement section. This further reduces the loss occurring in the mode conversion.

Further, the substrate-type optical waveguide element is preferably configured such that the core further includes a slab via which the first core and the second core are communicated with each other in the interaction section, the slab having a height lower than heights of the first core and the second core.

With the above configuration, a cross-section of the core is vertically asymmetrical, the cross-section being in the interaction section and being perpendicular to the traveling direction of light. Consequently, regardless of the materials of the lower cladding and the upper cladding, a refractive index distribution in a cross-section of the substrate-type optical waveguide element is vertically asymmetrical, the cross-section being in the interaction section and being perpendicular to the traveling direction of light. This enhances flexibility in selection of materials of the lower core and the upper core.

Further, the substrate-type optical waveguide element is preferably configured to further include a fourth core having an emission edge surface connected with the entrance edge surface of the first core; and a fifth core having an emission edge surface connected with the entrance edge surface of the second core, wherein a distance between the fourth core and the fifth core increases as the distance is located further from the starting point of the side-by-side arrangement section.

The entrance edge surface of the fourth core serves as the first entrance port of the substrate-type optical waveguide element, and the entrance edge surface of the fifth core serves as the entrance port of the substrate-type optical waveguide element. According to the above configuration, an adequately long distance is achieved between the first entrance port and the second entrance port of the substrate-type optical waveguide element 1.

Further, the substrate-type optical waveguide element is preferably configured to further include a slab via which the fourth core and the fifth core are communicated with each other, the slab having a height identical to the height of the slab via which the first core and the second care are communicated with each other; a first tapered part having a height identical to the height of the slab, the first tapered part being communicated with the fourth core and the slab via which the fourth core and the fifth core are communicated with each other, the first tapered part having a width increasing as the width is located further from an entrance edge surface of the fourth core; and a second tapered part having a height identical to the height of the slab, the second tapered part being communicated with the fifth core and the slab via which the fourth core and the fifth core are communicated with each other, the second tapered part having a width increasing as the width is located further from an entrance edge surface of the fifth core.

With the above configuration, the first tapered part and the second tapered part can gradually strengthen the interaction between the odd mode of the TE0 polarized wave and the even mode of the TE0 polarized wave as light guided through the fourth core and the fifth core gets closer to the starting point of the side-by-side arrangement section from the first entrance port and the second entrance port.

Further, the substrate-type optical waveguide element is preferably configured such that the lower cladding and the upper cladding are made of materials having different refractive indexes.

With the above configuration, the cross-section of the core may have a vertically symmetric shape, the cross-section being in the interaction section and being perpendicular to the traveling direction of light. This eliminates the need of forming the slab, and this further simplifies the manufacturing process.

Further, the substrate-type optical waveguide element is preferably configured such that each of the first core, the second core, and the third core has a cross sectional shape of a trapezoid or a quasi-trapezoid.

With the above configuration, the core having a vertically asymmetric cross-sectional shape can be formed by performing an etching process once. This further simplifies the manufacturing process.

Further, the substrate-type optical waveguide element may be configured to further include a first phase modulator for modulating a TE0 polarized wave; and a second phase modulator for modulating a TE0 polarized wave, wherein the entrance edge surface of the first core is supplied with a TE0 polarized wave modulated by the first phase modulator, and the entrance edge surface of the second core is supplied with a TE0 polarized wave modulated by the second phase modulator.

With the above configuration, the substrate-type optical waveguide element serves as an optical modulator including a polarization multiplexing waveguide. Such a substrate-type optical waveguide element brings about similar effects to those given by the substrate-type optical waveguide element.

Further, a substrate-type optical waveguide element according to each of the above-described embodiments may alternatively be expressed as a substrate-type optical waveguide element including: a lower cladding; a core on the lower cladding, the core including a first core and a second core arranged side by side and a third core having an entrance edge surface connected to emission edge surfaces of the first core and the second core; and an upper cladding on the lower cladding, the upper cladding covering the core, the first core and the second core being arranged side by side in a side-by-side arrangement section that is started in a starting point corresponding to entrance edge surfaces of the first core and the second core and is ended in an ending point corresponding to the emission edge surfaces of the first core and the second core, an effective refractive index of a TE0 polarized wave guided through the first core in the absence of the second core being lower than an effective refractive index of a TE0 polarized wave guided through the second core in the absence of the first core, each of the effective refractive indexes being observed in the starting point of the side-by-side arrangement section, a magnitude relationship between an effective refractive index of an odd mode of a TE0 polarized wave guided through the core and an effective refractive index of an even mode of a TM0 polarized wave guided through the core being reversed between the starting point and the ending point of the side-by-side arrangement section, a refractive index distribution in a cross-section of the substrate-type optical waveguide element being vertically asymmetrical, the cross-section being perpendicular to a traveling direction of light guided through the core, the cross-section being in an interaction section, in which the odd mode of the TE0 polarized wave guided through the core and the even mode of the TM0 polarized wave guided through the core interact with each other, a mode that is the odd mode of the TE0 polarized wave in the starting point of the side-by-side arrangement section and a mode that is the even mode of the TM0 polarized wave in the starting point of the side-by-side arrangement section being continuous as a function of a distance from the starting point of the side-by-side arrangement section. As such, each of the above-described configurations is applicable also to the substrate-type optical waveguide element.

INDUSTRIAL APPLICABILITY

The present invention is applicable to a substrate-type optical waveguide element serving as a polarization multiplexing waveguide. Further, the present invention is applicable to an optical modulator including such a substrate-type optical waveguide element.

Reference Signs List
  1, 2, 3, 6 Substrate-type optical waveguide element
  11, 21, 31, 61 Core
  11a, 21a, 31a, 61a First core
  11a1 Entrance edge surface
  11a2 Emission edge surface
  11b, 21b, 31b, Second core
  11b1 Entrance edge surface
  11b2 Emission edge surface
  11c, 21c, 31c, 61c Third core
  11c1 Entrance edge surface
  11c2 Emission edge surface
  11d, 61d Slab
  I Side-by-side arrangement section
  i. Interaction section
  12, 22, 32, 62 Lower cladding
  13, 23, 63 Upper cladding
  14 Separator
  14a Fourth core
  14b Fifth core
  14c Slab
  15 Converting part
  15a Fourth core
  15a1 Entrance edge surface
  15b Fifth core
  15b1 Entrance edge surface
  15c Slab
  15d First tapered part
  15e Second tapered part

The invention claimed is:
1. A substrate-type optical waveguide element comprising:
  a lower cladding;
  a core on the lower cladding, the core including a first core and a second core arranged side by side and a third core having an entrance edge surface connected to emission edge surfaces of the first core and the second core; and
  an upper cladding on the lower cladding, the upper cladding covering the core,
  the first core and the second core being arranged side by side in a side-by-side arrangement section that is started in a starting point corresponding to entrance edge surfaces of the first core and the second core and is ended in an ending point corresponding to the emission edge surfaces of the first core and the second core,
  an effective refractive index of a TE0 polarized wave guided through the first core in the absence of the second core being lower than an effective refractive index of a TE0 polarized wave guided through the second core in the absence of the first core, each of the effective refractive indexes being observed in the starting point of the side-by -side arrangement section.
  an effective refractive index of a TM0 polarized wave guided through the first core in the absence of the second core and the effective refractive index of the TE0 polarized wave guided through the second core in the absence of the first core being continuous as a function of a distance from the starting point of the side-by-side arrangement section,
  a magnitude relationship between an effective refractive index of an odd mode of a TE0 polarized wave guided through the core and an effective refractive index of an even mode of a TM0 polarized wave guided through the core being reversed between the starting point and the ending point of the side-by-side arrangement section,
  a refractive index distribution in a cross-section of the substrate-type optical waveguide element being vertically asymmetrical, the cross-section being perpendicular to a traveling direction of light guided through the core, the cross-section being in an interaction section, in which the odd mode of the TE0 polarized wave guided through the core and the even mode of the TM0 polarized wave guided through the core interact with each other.

2. The substrate-type optical waveguide element as set forth in claim 1,
  wherein the emission edge surface of the first core and the emission edge surface of the second core are apart from each other.

3. The substrate-type optical waveguide element as set forth in claim 1, wherein the emission edge surface of the first core and the emission edge surface of the second core are congruent with each other, wherein a cross-section of the core which cross-section is located in an entrance side of the ending point of the side-by-side arrangement section has a horizontally symmetric shape, and a cross-section of the core which cross-section is located in an emission side of the ending point of the side-by-side arrangement section has a horizontally symmetric shape, and wherein a symmetric axis of the cross-section of the core which cross-section is located in the entrance side of the ending point of the side-by-side arrangement section and a symmetric axis of the cross-section of the core which cross-section is located in the emission side of the ending point of the side-by-side arrangement section coincide with each other.

4. The substrate-type optical waveguide element as set forth in claim 1, wherein a width $W_{1out}$ of the emission edge surface of the first core, a width $W_{2out}$ of the emission edge surface of the second core, and a width $W_{3in}$ of the entrance edge surface of the third core satisfy $W_{1out}+W_{2out}>W_{3in}$.

5. The substrate-type optical waveguide element as set forth in claim 1, wherein a distance between the first core and the second core is gradually reduced as the distance is located closer to the ending point from the starting point in the side-by-side arrangement section.

6. The substrate-type optical waveguide element as set forth in claim 1, wherein the core further includes a slab via which the first core and the second core are communicated with each other in the interaction section, the slab having a height lower than heights of the first core and the second core.

7. The substrate-type optical waveguide element as set forth in claim 6, further comprising:

a fourth core having an emission edge surface connected with the entrance edge surface of the first core; and a fifth core having an emission edge surface connected with the entrance edge surface of the second. core, wherein a distance between the fourth core and the fifth core increases as the distance is located further from the starting point of the side-by-side arrangement section.

8. The substrate-type optical waveguide element as set forth in claim 7, further comprising:

a slab via which the fourth core and the fifth core are communicated with each other, the slab having a height identical to the height of the slab via which the first core and the second core are communicated with each other;

a first tapered part having a height identical to the height of the slab, the first tapered part being communicated with the fourth core and the slab via which the fourth core and the fifth core are communicated with each other, the first tapered part having a width increasing as the width is located further from an entrance edge surface of the fourth core; and a second tapered part having a height identical to the height of the slab, the second tapered part being communicated with the fifth core and the slab via which the fourth core and the fifth core are communicated with each other, the second tapered part having a width increasing as the width is located further from an entrance edge surface of the fifth core.

9. The substrate-type optical waveguide element as set forth in claim 1, wherein the lower cladding and the upper cladding are made of materials having different refractive indexes.

10. The substrate-type optical waveguide element as set forth in claim 1, wherein each of the first core, the second core, and the third core has a cross-sectional shape of a trapezoid or a quasi-trapezoid.

11. The substrate-type optical waveguide element as set forth in claim 1, further comprising:

a first phase modulator for modulating a TE0 polarized wave; and a second phase modulator for modulating a TE0 polarized wave, wherein the entrance edge surface of the first core is supplied with a TE0 polarized wave modulated by the first phase modulator, and the entrance edge surface of the second core is supplied with a TE0 polarized wave modulated by the second phase modulator.

12. A substrate-type optical waveguide element comprising:

a lower cladding;

a core on the lower cladding, the core including a first core and a second core arranged side by side and a third core having an entrance edge surface connected to emission edge surfaces of the first core and the second core; and an upper cladding on the lower cladding, the upper cladding covering the core, the first core and the second core being arranged side by side in a side-by-side arrangement section that is started in a starting point corresponding to entrance edge surfaces of the first core and the second core and is ended in an ending point corresponding to the emission edge surfaces of the first core and the second core, an effective refractive index of a TE0 polarized wave guided through the first core in the absence of the second core being lower than an effective refractive index of a TE0 polarized wave guided through the second core in the absence of the first core, each of the effective refractive indexes being observed in the starting point of the side-by-side arrangement section, a magnitude relationship between an effective refractive index of an odd mode of a TE0 polarized wave guided through the core and an effective refractive index of an even mode of a TM0 polarized wave guided through the core being reversed between the starting point and the ending point of the side-by-side arrangement section, a refractive index distribution in a cross-section of the substrate-type optical waveguide element being vertically asymmetrical, the cross-section being perpendicular to a traveling direction of light guided through the core, the cross-section being in an interaction section, in which the odd mode of the TE0 polarized wave guided through the core and the even mode of the TM0 polarized wave guided through the core interact with each other, a mode that is the odd mode of the TE0 polarized wave in the starting point of the side-by-side arrangement section and a mode that is the even mode of the TM0 polarized wave in the starting point of the side-by-side arrangement section being continuous as a function of a distance from the starting point of the side-by-side arrangement section.

* * * * *